US011539422B2

(12) United States Patent
Wu et al.

(10) Patent No.: US 11,539,422 B2
(45) Date of Patent: Dec. 27, 2022

(54) BEAM MANAGEMENT METHOD, TERMINAL, NETWORK DEVICE, AND STORAGE MEDIUM

(71) Applicant: HUAWEI TECHNOLOGIES CO., LTD., Shenzhen (CN)

(72) Inventors: Ji Wu, Shanghai (CN); Jun Zhu, Shenzhen (CN); Qiong Jia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 16/991,364

(22) Filed: Aug. 12, 2020

(65) Prior Publication Data
US 2020/0373993 A1    Nov. 26, 2020

Related U.S. Application Data

(63) Continuation of application No. PCT/CN2019/072602, filed on Jan. 22, 2019.

(30) Foreign Application Priority Data

Feb. 13, 2018 (CN) .......................... 201810151009.0

(51) Int. Cl.
*H04W 4/00* (2018.01)
*H04B 7/06* (2006.01)
(Continued)

(52) U.S. Cl.
CPC ......... *H04B 7/0695* (2013.01); *H04B 17/318* (2015.01); *H04L 5/0051* (2013.01);
(Continued)

(58) Field of Classification Search
None
See application file for complete search history.

(56) References Cited

U.S. PATENT DOCUMENTS

2017/0034685 A1* 2/2017 Jiang ................. H04W 74/0816
2019/0069312 A1* 2/2019 Oh ......................... H04W 52/34
(Continued)

FOREIGN PATENT DOCUMENTS

CN    105451341 A    3/2016
CN    106658751 A    5/2017
(Continued)

OTHER PUBLICATIONS

3GPP TR 38.912 V14.1.0:"3rd Generation Partnership Project;Technical Specification Group Radio Access Network; Study on New Radio (NR) access technology(Release 14)",Jun. 2017,total 76 pages.
MediaTek Inc.,:"Mobility Supporting for HF-NR",3GPP TSG-RAN WG2 #94,R2-163484, Nanjing, China, May 23-27, 2016,total 6 pages.
(Continued)

*Primary Examiner* — Zewdu A Beyen
(74) *Attorney, Agent, or Firm* — Hauptman Ham, LLP

(57) ABSTRACT

Embodiments of this application provide a beam management method, a terminal, a network device, and a storage medium. The method includes: when a quantity of reference signals whose RSSIs are greater than a first preset value in reference signals received on a first time-frequency resource on one of one or more beams is less than a second preset value, detecting, by the terminal, a reference signal and/or downlink indication information (used to indicate a sending status of the reference signal on the first time-frequency resource and/or a second time-frequency resource on the beam) from the network device on the second time-frequency resource on the beam. Further, when receiving the downlink indication information on the second time-frequency resource on the beam, the terminal continues to detect a reference signal from the network device on the beam, thereby saving communications system resources.

19 Claims, 11 Drawing Sheets

(51) Int. Cl.
*H04B 17/318* (2015.01)
*H04L 5/00* (2006.01)
*H04W 72/04* (2009.01)

(52) U.S. Cl.
CPC ....... *H04W 72/042* (2013.01); *H04W 72/046* (2013.01); *H04W 72/0446* (2013.01); *H04W 72/0453* (2013.01)

(56) References Cited

U.S. PATENT DOCUMENTS

2019/0200248 A1* 6/2019 Basu Mallick ...... H04B 7/0695
2019/0356451 A1* 11/2019 Zhang .................. H04B 17/327

FOREIGN PATENT DOCUMENTS

| CN | 107453794 A | 12/2017 |
| CN | 107567038 A | 1/2018 |
| KR | 20170093071 A | 8/2017 |
| WO | 2017026794 A1 | 2/2017 |
| WO | 2017164933 A1 | 9/2017 |

OTHER PUBLICATIONS

Huawei et al., "Initial access in NR unlicensed.", 3GPP TSG RAN WG1 Meeting #94, R1-1808062., Gothenburg, Sweden, Aug. 20-Aug. 24, 2018. total 6 pages.
Ericsson., "Further discussion on support of CSI Measurement and Reporting for LAA.", 3GPP TSG RAN WG1 Meeting #80bis, R1-152011. Belgrade, Serbia, Apr. 20-24, 2015, total 4 pages.
India Examination Report issued in corresponding India Application No. 202037038887, dated Sep. 2, 2021, pp. 1-6.
Huawei, HiSilicon, Remaining details on beam failure recovery. 3GPP TSG RAN WG1 Meeting 91, Reno, USA, Nov. 27-Dec. 1, 2017, R1-1719423, 9 pages.
Huawei, HiSilicon, Procedure Details for Beam Failure Recovery. 3GPP TSG RAN WG1 Meeting #90, Prague, Czech Republic, Aug. 21-25, 2017, R1-1712224, 12 pages.
ATandT, Beam Failure Events and Criteria for Declaring Radio Link Failure. 3GPP TSG-RAN WG2 #99, Berlin, Germany, Aug. 21-25, 2017, R2-1708205, 4 pages.
European Search Report issued in corresponding European Patent Application No. 19753910.9, dated Mar. 16, 2021, pp. 1-20, European Patent Office, Munich, Germany.

* cited by examiner

BEAM MANAGEMENT METHOD, TERMINAL, NETWORK DEVICE, AND STORAGE MEDIUM

CROSS-REFERENCE TO RELATED APPLICATIONS

This application is a continuation of International Application No. PCT/CN 2019/072602, filed on Jan. 22, 2019, which claims priority to Chinese Patent Application No. 201810151009.0, filed on Feb. 13, 2018, The disclosures of the aforementioned applications are hereby incorporated by reference in their entireties.

TECHNICAL FIELD

This application relates to the field of communications technologies, and in particular, to a beam management method, a terminal, a network device and a storage medium in an unlicensed frequency band for new radio (new radio, NR).

BACKGROUND

Generally, in high frequency (High frequency, HF) communication, transmission attenuation of an electromagnetic wave signal is large. Before a network device communicates with a terminal, beamforming training (Beamforming training, BFT) needs to be performed to increase a communication link budget (link budget). To be specific, an antenna beam (beam) direction between the network device and the terminal is adjusted, so that omnidirectional transmit energy of a receive antenna and/or a transmit antenna is concentrated in a relatively narrow direction, thereby increasing energy and/or a signal-to-noise ratio of a received signal.

If a location of the terminal changes or the terminal is flipped, an original beam may fail, and consequently the terminal cannot communicate with the network device. Therefore, the terminal needs to perform a subsequent beam recovery process (for example, determining a candidate beam, sending a beam recovery request, and/or receiving a response). However, relatively more resources, for example, time resources, need to be consumed in the beam recovery process. Therefore, how to accurately determine whether to start a beam recovery process is an urgent problem to be resolved.

SUMMARY

Embodiments of this application provide a beam management method, a terminal, a network device, and a storage medium, to avoid a waste of communications system resources caused because a terminal starts a beam recovery process when only a small quantity of reference signals on a beam are not received.

According to a first aspect, an embodiment of this application provides a beam management method. The method includes:

detecting a reference signal from a network device on a first time-frequency resource on one or more beams;

when a quantity of reference signals whose received signal strength indicators RSSIs are greater than a first preset value in reference signals received on the first time-frequency resource on one of the one or more beams is less than a second preset value, detecting a reference signal and/or downlink indication information from the network device on a second time-frequency resource on the beam, where the downlink indication information is used to indicate a sending status of the reference signal on the first time-frequency resource and/or the second time-frequency resource on the beam; and when the downlink indication information is received on the second time-frequency resource on the beam, continuing to detect a reference signal from the network device on the beam.

In the beam management method provided in the first aspect, when the quantity of reference signals whose received signal strength indicators RSSIs are greater than the first preset value in the reference signals received on the first time-frequency resource on one of the one or more beams is less than the second preset value, a terminal detects the reference signal and/or downlink indication information (used to indicate the sending status of the reference signal on the first time-frequency resource and/or the second time-frequency resource on the beam) from the network device on the second time-frequency resource on the beam. Further, when receiving the downlink indication information on the second time-frequency resource on the beam, the terminal continues to detect a reference signal from the network device on the beam. Therefore, a problem that communications system resources are wasted because the terminal starts a beam recovery process when only a small quantity of reference signals on the beam are not received is avoided, and communications system resources are saved.

In a possible implementation, the detecting a reference signal and/or downlink indication information from the network device on a second time-frequency resource on the beam includes:

detecting the reference signal and/or downlink indication information on a part of the second time-frequency resource on the beam, where the reference signal detected on the second time-frequency resource on the beam is a part of the reference signals detected on the first time-frequency resource on the beam.

In a possible implementation, the downlink indication information includes at least one of the following information:

an identifier of at least one reference signal that has been sent on the second time-frequency resource on the beam;

an identifier of at least one reference signal that is not sent on the second time-frequency resource on the beam;

a transmission resource used to resend the at least one reference signal that is not sent on the second time-frequency resource on the beam;

an identifier of at least one reference signal that has been sent on the first time-frequency resource on the beam; and an identifier of at least one reference signal that is not sent on the first time-frequency resource on the beam.

In a possible implementation, if the downlink indication information includes the transmission resource used to resend the at least one reference signal that is not sent on the second time-frequency resource on the beam, the method further includes:

receiving the at least one reference signal on the transmission resource of the at least one reference signal based on the downlink indication information.

In a possible implementation, the downlink indication information includes:

an identifier of at least one reference signal that is not sent on the second time-frequency resource on the beam and that corresponds to the latest preset sending time.

In a possible implementation, the downlink indication information is carried in a physical downlink control channel PDCCH or a physical downlink shared channel PDSCH.

In a possible implementation, the method further includes:

performing beam recovery when a quantity of reference signals whose RSSIs are greater than the first preset value in reference signals received on the second time-frequency resource on the beam is less than the second preset value, and the downlink indication information is not received on the second time-frequency resource on the beam.

According to a second aspect, an embodiment of this application provides a beam management method. The method includes:

performing idle channel listening on a second time-frequency resource on one or more beams; and if a second time-frequency resource on one of the one or more beams is idle, sending a reference signal and/or downlink indication information to a terminal on the second time-frequency resource on the beam, where the downlink indication information is used to indicate a sending status of the reference signal on a first time-frequency resource and/or the second time-frequency resource on the beam, and the first time-frequency resource is located before the second time-frequency resource in time domain.

In the beam management method provided in the second aspect, when determining that the second time-frequency resource on one of the one or more beams is idle through idle channel listening, a network device sends the reference signal and/or downlink indication information (used to indicate the sending status of the reference signal on the first time-frequency resource and/or the second time-frequency resource on the beam) to the terminal on the second time-frequency resource on the beam, so that the terminal learns of the sending status of the reference signal on the first time-frequency resource and/or the second time-frequency resource on the beam, and can accurately determine whether to continue to detect a reference signal on the beam or start a beam recovery process, thereby saving communications system resources.

In a possible implementation, the sending a reference signal and/or downlink indication information to a terminal on the second time-frequency resource on the beam includes:

sending the reference signal and/or downlink indication information to the terminal on a part of the second time-frequency resource on the beam, where the reference signal sent to the terminal on the second time-frequency resource on the beam is a part of reference signals sent to the terminal on the first time-frequency resource on the beam.

In a possible implementation, the downlink indication information includes at least one of the following information:

an identifier of at least one reference signal that has been sent on the second time-frequency resource on the beam:

an identifier of at least one reference signal that is not sent on the second time-frequency resource on the beam:

a transmission resource used to resend the at least one reference signal that is not sent on the second time-frequency resource on the beam:

an identifier of at least one reference signal that has been sent on the first time-frequency resource on the beam; and an identifier of at least one reference signal that is not sent on the first time-frequency resource on the beam.

In a possible implementation, the downlink indication information includes an identifier of at least one reference signal that is not sent on the second time-frequency resource on the beam and that corresponds to the latest preset sending time.

In a possible implementation, the downlink indication information is carried in a physical downlink control channel PDCCH or a physical downlink shared channel PDSCH.

According to a third aspect, an embodiment of this application provides a terminal, including:

a first detection module, configured to detect a reference signal from a network device on a first time-frequency resource on one or more beams:

a second detection module, configured to: when a quantity of reference signals whose received signal strength indicators RSSIs are greater than a first preset value in reference signals received on the first time-frequency resource on one of the one or more beams is less than a second preset value, detect a reference signal and/or downlink indication information from the network device on a second time-frequency resource on the beam, where the downlink indication information is used to indicate a sending status of the reference signal on the first time-frequency resource and/or the second time-frequency resource on the beam; and a third detection module, configured to: when the downlink indication information is received on the second time-frequency resource on the beam, continue to detect a reference signal from the network device on the beam.

In a possible implementation, the second detection module is specifically configured to:

detect the reference signal and/or downlink indication information on a part of the second time-frequency resource on the beam, where the reference signal detected on the second time-frequency resource on the beam is a part of the reference signals detected on the first time-frequency resource on the beam.

In a possible implementation, the downlink indication information includes at least one of the following information:

an identifier of at least one reference signal that has been sent on the second time-frequency resource on the beam;

an identifier of at least one reference signal that is not sent on the second time-frequency resource on the beam;

a transmission resource used to resend the at least one reference signal that is not sent on the second time-frequency resource on the beam;

an identifier of at least one reference signal that has been sent on the first time-frequency resource on the beam; and an identifier of at least one reference signal that is not sent on the first time-frequency resource on the beam.

In a possible implementation, if the downlink indication information includes the transmission resource used to resend the at least one reference signal that is not sent on the second time-frequency resource on the beam, the terminal further includes:

a receiving module, configured to receive the at least one reference signal on the transmission resource of the at least one reference signal based on the downlink indication information.

In a possible implementation, the downlink indication information includes:

an identifier of at least one reference signal that is not sent on the second time-frequency resource on the beam and that corresponds to the latest preset sending time.

In a possible implementation, the downlink indication information is carried in a physical downlink control channel PDCCH or a physical downlink shared channel PDSCH.

In a possible implementation, the terminal further includes:

a recovery module, configured to perform beam recovery when a quantity of reference signals whose RSSIs are greater than the first preset value in reference signals received on the second time-frequency resource on the beam is less than the second preset value, and the downlink indication information is not received on the second time-frequency resource on the beam.

For beneficial effects of the terminal provided in the implementations of the third aspect, refer to the beneficial effects brought by the implementations of the first aspect. Details are not described herein again.

According to a fourth aspect, an embodiment of this application provides a network device, including:

a listening module, configured to perform idle channel listening on a second time-frequency resource on one or more beams; and a sending module, configured to: if a second time-frequency resource on one of the one or more beams is idle send a reference signal and/or downlink indication information to a terminal on the second time-frequency resource on the beam, where the downlink indication information is used to indicate a sending status of the reference signal on a first time-frequency resource and/or the second time-frequency resource on the beam, and the first time-frequency resource is located before the second time-frequency resource in time domain.

In a possible implementation, the sending module is specifically configured to:

send the reference signal and/or downlink indication information to the terminal on a part of the second time-frequency resource on the beam, where the reference signal sent to the terminal on the second time-frequency resource on the beam is a part of reference signals sent to the terminal on the first time-frequency resource on the beam.

In a possible implementation, the downlink indication information includes at least one of the following information:

an identifier of at least one reference signal that has been sent on the second time-frequency resource on the beam;

an identifier of at least one reference signal that is not sent on the second time-frequency resource on the beam;

a transmission resource used to resend the at least one reference signal that is not sent on the second time-frequency resource on the beam;

an identifier of at least one reference signal that has been sent on the first time-frequency resource on the beam; and an identifier of at least one reference signal that is not sent on the first time-frequency resource on the beam.

In a possible implementation, the downlink indication information includes an identifier of at least one reference signal that is not sent on the second time-frequency resource on the beam and that corresponds to the latest preset sending time.

In a possible implementation, the downlink indication information is carried in a physical downlink control channel PDCCH or a physical downlink shared channel PDSCH.

For beneficial effects of the network device provided in the implementations of the fourth aspect, refer to the beneficial effects brought by the implementations of the second aspect. Details are not described herein again.

According to a fifth aspect, an embodiment of this application provides a terminal, including a processor and a memory, where the memory is configured to store a program instruction; and the processor is configured to invoke and execute the program instruction stored in the memory; and when the processor executes the program instruction stored in the memory, the terminal is configured to perform the method according to any one of the implementations of the first aspect.

According to a sixth aspect, an embodiment of this application provides a network device, including a processor and a memory, where the memory is configured to store a program instruction; and the processor is configured to invoke and execute the program instruction stored in the memory; and when the processor executes the program instruction stored in the memory, the network device is configured to perform the method according to any one of the implementations of the second aspect.

According to a seventh aspect, an embodiment of this application provides a chip system. The chip system includes a processor, and may further include a memory. The chip system is configured to implement the method according to any one of the implementations of the first aspect. The chip system may include a chip, or may include a chip and another discrete component.

According to an eighth aspect, an embodiment of this application provides a program. When being executed by a processor, the program is configured to perform the method according to any one of the implementations of the first aspect.

According to a ninth aspect, an embodiment of this application provides a computer program product including an instruction. When the computer program product is run on a computer, the computer is enabled to perform the method according to any one of the implementations of the first aspect.

According to a tenth aspect, an embodiment of this application provides a computer-readable storage medium. The computer-readable storage medium stores an instruction. When the instruction is run on a computer, the computer is enabled to perform the method according to any one of the implementations of the first aspect.

According to an eleventh aspect, an embodiment of this application provides a chip system. The chip system includes a processor, and may further include a memory. The chip system is configured to implement the method according to any one of the implementations of the second aspect. The chip system may include a chip, or may include a chip and another discrete component.

According to a twelfth aspect, an embodiment of this application provides a program. When being executed by a processor, the program is configured to perform the method according to any one of the implementations of the second aspect.

According to a thirteenth aspect, an embodiment of this application provides a computer program product including an instruction. When the computer program product is run on a computer, the computer is enabled to perform the method according to any one of the implementations of the second aspect.

According to a fourteenth aspect, an embodiment of this application provides a computer-readable storage medium. The computer-readable storage medium stores an instruction. When the instruction is run on a computer, the computer is enabled to perform the method according to any one of the implementations of the second aspect.

DESCRIPTION OF EMBODIMENTS

First, a communication scenario and some terms used in the embodiments of this application are described.

Figure 1:
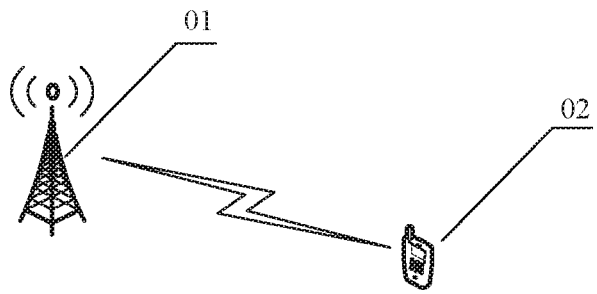
FIG. 1 is a schematic structural diagram of a communications system according to an embodiment of this application.

FIG. 1 is a schematic structural diagram of a communications system according to an embodiment of this application. As shown in FIG. 1, the communications system may include a network device 01 and a terminal 02. Certainly, the communications system may further include a plurality of terminals 02. This is not limited in the embodiments of this application. Processes in which the network device 01 performs beam management with each terminal 02 are similar to each other. In the embodiments of this application, a process in which the network device 01 performs beam management with any terminal 02 is used as an example for description.

In the embodiments of this application, a method on a network device side may be performed by a network device, or may be performed by an apparatus in a network device (it should be noted that the network device is used as an example for description in the embodiments provided in this application). For example, the apparatus in the network device may be a chip system, a circuit, a module, or the like. This is not limited in this application.

In the embodiments of this application, a method on a terminal (or referred to as a terminal device) side may be performed by a terminal, or may be performed by an apparatus in a terminal (it should be noted that the terminal is used as an example for description in the embodiments provided in this application). For example, the apparatus in the terminal device may be a chip system, a circuit, a module, or the like. This is not limited in this application.

A communications system in the embodiments of this application may be a long term evolution (long term evolution, LTE) communications system or a new radio (New Radio, NR) communications system (for example, the fifth-generation (5th-generation, 5G) mobile communications technology). Certainly, the communications system may alternatively be another type of communications system. This is not limited in the embodiments of this application.

The network device in this application may include, but is not limited to, a base station and a transmission reception point (transmission reception point, TRP). The base station is also referred to as a radio access network (radio access network, RAN) device, and is a device that connects a terminal to a wireless network. The base station may be a base transceiver station (base transceiver station, BTS) in a global system for mobile communications (global system of mobile communications, GSM) system or code division multiple access (code division multiple access, CDMA) system, a NodeB (nodeB, NB) in a wideband code division multiple access (wideband code division multiple access, WCDMA) system, an evolved NodeB (evolved node B, eNB or eNodeB) in a long term evolution (long term evolution, LTE) system, a relay station, an access point, a gNodeB (gNodeB, gNB) in a future 5G network, or the like. This is not limited herein.

The terminal in this application may alternatively be referred to as a terminal device. The terminal may be a wireless terminal or a wired terminal. The wireless terminal may be a device that provides a user with voice and/or other service data connectivity, a handheld device having a wireless connection function, or another processing device connected to a wireless modem. The wireless terminal may communicate with one or more core networks through a radio access network (radio access network, RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (personal communications service, PCS) phone, a cordless telephone, a session initiation protocol (session initiation protocol. SIP) phone, a wireless local loop (wireless local loop, WLL) station, or a personal digital assistant (personal digital assistant, PDA). The wireless terminal may also be referred to as a system, a subscriber unit (subscriber unit), a subscriber station (subscriber station), a mobile station (mobile station), a mobile console (mobile), a remote station (remote station), a remote terminal (remote terminal), an access terminal (access terminal), a user terminal (user terminal), a user agent (user agent), or a user device or user equipment (user device or user equipment, UE). This is not limited herein.

The terminal or the network device in this application may include a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more types of computer operating systems, for example, a Linux operating system, a Unix operating system, an Android operating system, an iOS operating system, or a Windows operating system, that implement service processing by using a process (process). The application layer includes applications such as a browser, a contact list, word processing software, and instant messaging software.

In this application, "at least one" refers to one or more, and "a plurality of" refers to two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one (one piece) of the following" or a similar expression thereof refers to any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural.

A time-frequency resource in the embodiments of this application may be in an unlicensed frequency band (unlicensed frequency band), or certainly may be in another frequency band. This is not limited in the embodiments of this application.

The unlicensed frequency band in the embodiments of this application is also referred to as a shared frequency band. A plurality of communications systems or communications devices may be allowed to perform data communication in the shared frequency band while fairness is ensured by using a channel listening mechanism such as listen before talk.

A licensed band in the embodiments of this application is a dedicated communication frequency band allocated to an LTE or 5G communications system for communication.

A second time-frequency resource on any beam in the embodiments of this application is a time-frequency resource on the beam that is located after the first time-frequency resource in time domain (or the first time-frequency resource on the beam is located before the second time-frequency resource in time domain). For example, duration corresponding to the first time-frequency resource and the second time-frequency resource may be equal to a sending period of a reference signal, or may be a multiple (an integer multiple greater than 1) of the sending period of the reference signal. Certainly, the duration of the first time-frequency resource and the duration of the second time-frequency resource may alternatively be equal to another value. This is not limited in the embodiments of this application.

A reference signal in the embodiments of this application may include, but is not limited to, any one of the following: a channel state information-reference signal (Channel State Information-Reference Signal, CSI-RS) and a synchronization signal block (Synchronization Signal Block, SSB). The SSB may be used for random access and/or beam tracking and update.

Resetting a beam detection timer in the embodiments of this application refers to: setting timing duration of the beam detection timer to initial duration and suspending the beam detection timer.

A time-frequency resource in the embodiments of this application may include a time domain resource and/or a frequency domain resource.

A transmission resource in the embodiments of this application may include, but is not limited to, at least one of the following: a time domain resource, a frequency domain resource, and a port (port) resource.

Downlink indication information in the embodiments of this application may be carried in a physical downlink control channel (Physical Downlink Control Channel, PDCCH) or a physical downlink shared channel (Physical Downlink Shared Channel, PDSCH). For example, the downlink indication information may be carried in downlink control information (Downlink Control Information, DCI) in the PDCCH. Certainly, the downlink indication information may alternatively be carried in other information in the PDCCH. This is not limited in the embodiments of this application. Certainly, the downlink indication information may alternatively be carried in another manner. This is not limited in the embodiments of this application.

For example, a terminal connected to a network device may attempt to receive and/or decode, by using a cellular radio network temporary identifier (Cell Radio Network Temporary Identifier, C-RNTI) allocated by the network device, the DCI used to carry the downlink indication information. For example, a sleeping terminal or a terminal not connected to a network device may receive and/or decode, by using a predefined system information radio network temporary identifier (System Information Radio Network Temporary Identifier, SI-RNTI) or another similar RNTI, the DCI used to carry the downlink indication information.

A beam recovery process in the embodiments of this application may include the following several steps.

Step 1. Determine a Candidate Beam

In this embodiment, after determining that a current beam fails, the terminal determines the candidate beam by detecting a periodically sent reference signal, and records an identity (Identity, ID) of the candidate beam. For example, the identity of the candidate beam may include, but is not limited to, any one of the following: an identifier of a CSI-RS and an identifier of an SSB. For example, after learning of the identifier of the CSI-RS or the identifier of the SSB, the terminal or the network device may uniquely determine a corresponding beam (that is, the candidate beam) based on a preset mapping relationship (including an identity of a beam and the beam corresponding to the identity of the beam).

Step 2. Send a Beam Recovery Request

In this embodiment, the terminal determines a physical random access channel (Physical Random Access Channel, PRACH) resource corresponding to the candidate beam based on the identity of the candidate beam and resource configuration information. The resource configuration information includes the identity of the candidate beam and PRACH resource corresponding to the candidate beam. Further, the beam recovery request is sent by using the PRACH resource corresponding to the candidate beam. The beam recovery request may include the identity of the candidate beam (so that the network device learns of a specific beam used for communication with the terminal).

Step 3. Receive a Response

In this embodiment, after sending the beam recovery request, the terminal continuously listens to the response sent by the network device on the determined candidate beam. If the response sent by the network device is received, the beam recovery succeeds; or if no response sent by the network device is received within a preset time period, the beam recovery fails, and steps 2 and step 3 are repeatedly performed.

Certainly, the beam recovery process in the embodiments of this application may further include another step. This is not limited in this embodiment of this application.

Figure 2:
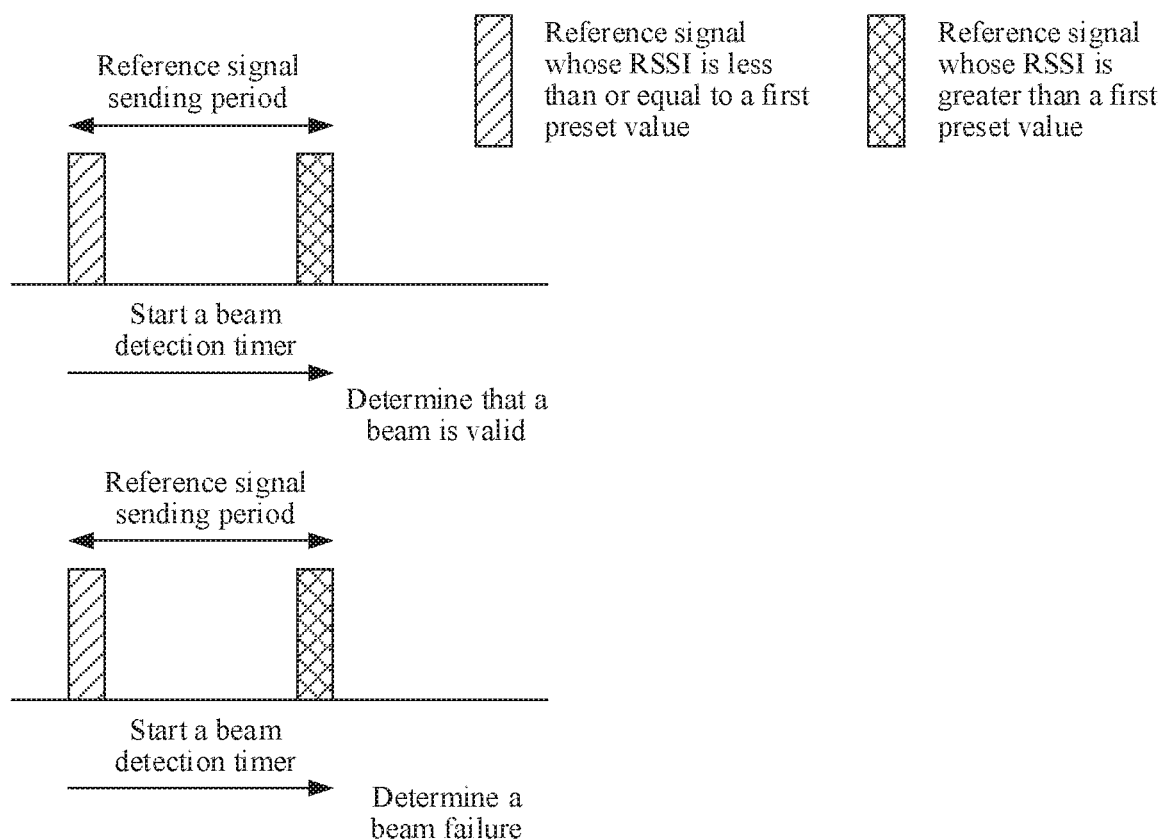
FIG. 2 is a schematic diagram 1 of beam management according to an embodiment of this application.

A channel contention access mechanism for channel listening in the embodiments of this application may include two types: a type A LBT (type A LBT) and a type B LBT (type B LBT). (1). The type A LBT means that the device can perform independent backoff on a plurality of carriers (Component Carrier, CC). After the backoff on a carrier is completed, transmission is delayed to wait for another carrier that is still backing off. After the backoff on all carriers on which LBT is performed is completed, the device further needs to perform a clear channel assessment (Clear Channel Assessment, CCA) to ensure that all the carriers are idle. If all the carriers are idle, the device performs simultaneous transmission on the idle carriers. (2). The type B LBT means that the device performs backoff on only one carrier selected from a plurality of carriers. When the backoff ends, the CCA is performed on another carrier, and if the another carrier is idle, data transmission is performed; or if the another carrier is not idle, the data transmission cannot be performed on the another carrier at this time. It should be noted that the carrier may also be understood as a channel, that is, the carrier-based CCA may also be understood as a channel-based CCA FIG. 2 is a schematic diagram 1 of beam management according to an embodiment of this application. The terminal determines, by detecting a periodic reference signal, whether a current beam is available. As shown in FIG. 2, if a received signal strength indicator (received signal strength indicator, RSSI) of a reference signal received on the current beam is less than or equal to a first preset value, a beam monitoring timer (beam monitoring timer) is started. Optionally, timing duration of the beam detection timer is a sending period of the reference signal. Further, if the RSSI of the reference signal received before timing of the beam detection timer ends is still less than or equal to the first preset value, a current beam failure (beam failure) occurs, and a subsequent beam recovery process (for example, determining a candidate beam, sending a beam recovery request, and/or receiving a response) is performed. If the RSSI of the reference signal received before the timing of the beam detection timer ends is greater than the first preset value, the current beam is valid (beam is still valid), and a reference signal may continue to be detected on the current beam and in this case, a beam recovery process is not required.

The beam management shown in FIG. 2 may be applicable only to a licensed frequency band. However, to ensure coexistence with another communications device in an unlicensed frequency band, the network device needs to use a channel contention access mechanism for channel listening (or referred to as listen-before-talk (Listen-Before-Talk, LBT) channel contention access mechanism). Because there is a possibility that the channel listening fails, the network device cannot send the reference signal at a pre-specified moment. As a result, the terminal may incorrectly determine that a current beam fails and perform a subsequent beam recovery process. Consequently, communications system resources are wasted.

According to the beam management method, the terminal, the network device, and the storage medium provided in the embodiments of this application, when determining that a second time-frequency resource on a beam (which may be any beam) is idle through idle channel listening, the network device sends a reference signal and/or downlink indication information (used to indicate a sending status of the reference signal on a first time-frequency resource and/or the second time-frequency resource on the beam) on the second time-frequency resource on the beam, so that the terminal learns of the sending status of the reference signal on the first time-frequency resource and/or the second time-frequency resource on the beam, and can accurately determine whether the beam is valid, to avoid a waste of the communications system resources because the terminal starts the beam recovery process when only a small quantity of reference signals on the beam are not received.

The technical solutions of this application and ways to resolve the foregoing technical problem in the technical solutions of this application are described below in detail by using specific embodiments. The following several specific embodiments may be combined with one another. Same or similar concepts or processes may not be described in detail in some embodiments.

Figure 3:
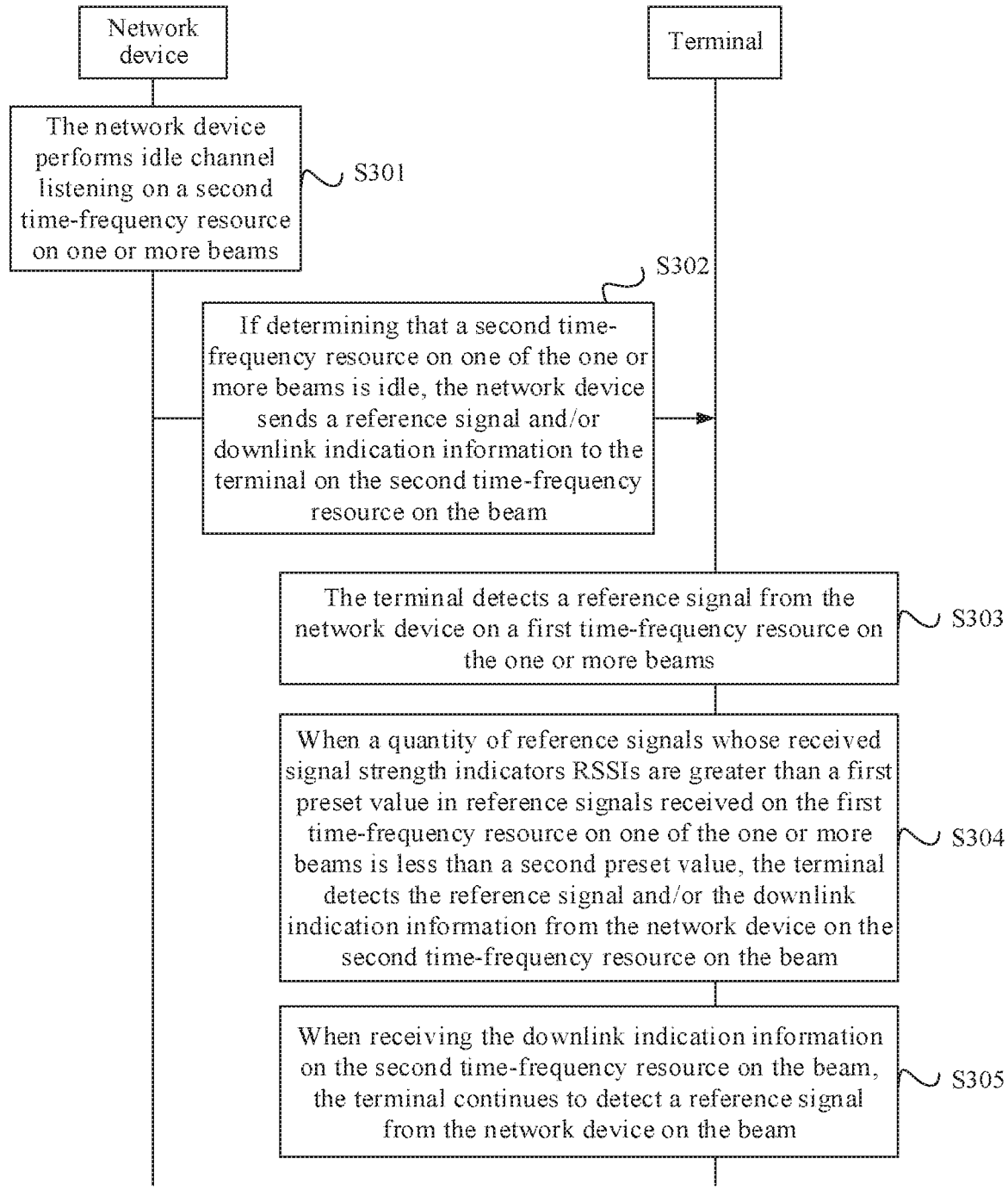
FIG. 3 is a schematic flowchart of a beam management method according to an embodiment of this application.

FIG. 3 is a schematic flowchart of a beam management method according to an embodiment of this application. As shown in FIG. 3, the method in this embodiment of this application may include the following steps.

Step S301: The network device performs idle channel listening on a second time-frequency resource on one or more beams.

In this step, the network device separately performs idle channel listening on the second time-frequency resource on at least one beam. For a specific idle channel listening manner, refer to a channel listening manner in a related technology. This is not limited in this embodiment of this application.

Step S302: If determining that a second time-frequency resource on one of the one or more beams is idle, the network device sends a reference signal and/or downlink indication information to a terminal on the second time-frequency resource on the beam.

In this step, if determining that the second time-frequency resource on any one of the one or more beams is idle, the network device may send the reference signal and/or the downlink indication information to the terminal on the second time-frequency resource on the beam. The downlink indication information is used to indicate a sending status of the reference signal on a first time-frequency resource and/or the second time-frequency resource on the beam. This is because the network device may learn whether the reference signal on the first time-frequency resource and/or the second time-frequency resource is successfully sent or fails to be sent, and send the downlink indication information including the sending status to the terminal, so that the terminal learns of the sending status of the reference signal on the first time-frequency resource and/or the second time-frequency resource on the beam, and can determine whether to continue to detect a reference signal on the beam or start a beam recovery process, thereby avoiding a waste of communications system resources because the terminal starts the beam recovery process when only a small quantity of reference signals on the beam are not received.

For example, when the network device cannot send a reference signal on the second time-frequency resource on the beam due to LBT, the network device may send the downlink indication information (used to indicate that the network device does not send the reference signal on the second time-frequency resource on the beam) to the terminal, so that the terminal does not mistakenly consider that the reference signal is not received because the beam fails.

In different embodiments, the downlink indication information may include at least one of the following information:

an identifier of at least one reference signal that has been sent on the second time-frequency resource on the beam, so that the terminal learns of the reference signal that has been sent on the second time-frequency resource on the beam;

an identifier of at least one reference signal that is not sent on the second time-frequency resource on the beam, so that the terminal learns of the reference signal that is not sent on the second time-frequency resource on the beam, to avoid a case in which the terminal mistakenly considers that the reference signal is not received because the beam fails;

a transmission resource used to resend the at least one reference signal that is not sent on the second time-frequency resource on the beam, so that the terminal learns of the transmission resource of the resent reference signal, and subsequently receives the resent reference signal on the corresponding transmission resource;

an identifier of at least one reference signal that has been sent on the first time-frequency resource on the beam, so that the terminal learns of the reference signal that has been sent on the first time-frequency resource on the beam; and an identifier of at least one reference signal that is not sent on the first time-frequency resource on the beam, so that the terminal learns of the reference signal that is not sent on the first time-frequency resource on the beam, to avoid a case in which the terminal mistakenly considers that the reference signal is not received because the beam fails.

In another embodiment, the downlink indication information may also include an identifier of at least one reference signal that is not sent on the second time-frequency resource on the beam and that corresponds to the latest preset sending time, so that the terminal learns of the at least one reference signal that is not sent at last on the second time-frequency resource on the beam, to avoid a case in which the terminal mistakenly considers that the reference signal is not received because the beam fails.

Certainly, the downlink indication information may further include other information. This is not limited in this embodiment of this application.

For example, the network device may send the reference signal and/or the downlink indication information to the terminal on all or a part of the second time-frequency resource on the beam. The reference signal sent to the terminal on the second time-frequency resource on the beam may be a part or all of reference signals sent to the terminal on the first time-frequency resource on the beam. Alternatively, it may be understood that the network device may send, to the terminal on the second time-frequency resource on the beam, all the reference signals sent by the network device on the first time-frequency resource, or send a part of the reference signals sent by the network device on the first time-frequency resource.

Several cases in which "the reference signal sent to the terminal on the second time-frequency resource on the beam may be a part or all of the reference signals sent to the terminal on the first time-frequency resource on the beam" are described in the following embodiments of this application.

For example, it is assumed that the network device sends a plurality of reference signals to the terminal on the first time-frequency resource on the beam, and the network device cannot send some of the plurality of reference signals to the terminal on the second time-frequency resource on the beam due to LBT. In this case, it may be understood that, the reference signals sent to the terminal on the second time-frequency resource on the beam are some of the reference signals sent to the terminal on the first time-frequency resource on the beam.

For example, it is assumed that the network device sends a plurality of reference signals to the terminal on the first time-frequency resource on the beam, and the network device cannot send some of the plurality of reference signals to the terminal on the second time-frequency resource on the beam due to LBT, but the network device subsequently resends the reference signals to the terminal on the second time-frequency resource on the beam. In this case, it may be understood that, the reference signals sent to the terminal on the second time-frequency resource on the beam are all the reference signals sent to the terminal on the first time-frequency resource on the beam.

For example, it is assumed that the network device sends, to the terminal on the first time-frequency resource on the beam due to LBT, some of the reference signals that need to be sent, and the network device also sends only some reference signals to the terminal on the second time-frequency resource on the beam due to LBT. In this case, the reference signals sent to the terminal on the second time-frequency resource on the beam are all the reference signals sent to the terminal on the first time-frequency resource on the beam.

An indication manner and/or a determining manner of the transmission resource of the resent reference signal are described in the following embodiments of this application. It should be noted that in the following embodiments of this application an example in which the reference signal is a CSI-RS is used for description.

TABLE 1

| CSI-RS configuration parameter table 1 | | |
| --- | --- | --- |
| RRC parameter name | Description | Value range and related parameter |
| Non-zero power CSI-RS identifier | Indicates an identifier corresponding to the CSI-RS | 0 to a maximum value of a non-zero power CSI-RS resource - 1 |
| Resource configuration type | Indicates a time feature of the CSI-RS | Periodic, aperiodic, and half-static |
| CSI-RS period | A period size of the CSI-RS when the CSI-RS is a periodic signal | CSI-RS period: {5, 10, 20, 40, 80, 160, 320, 640} slots (slots) |
| Quantity of antenna ports of the CSI-RS | Indicates the antenna port of the CSI-RS | 1, 2, 4, 8, 12, 16, 24, 32 |
| CSI-RS time-frequency resource configuration parameter | Indicates a specific time-frequency resource configured for the CSI-RS | Frequency domain resource: With different quantities of antenna ports, the CSI-RS has different start subcarriers: |

TABLE 1-continued

CSI-RS configuration parameter table 1

| RRC parameter name | Description | Value range and related parameter |
|---|---|---|
| Code division type | Indicates a quantity of CSI-RSs multiplexed by code division multiplexing (for example, 1, 2, 4, or 8) and a specific code division manner (for example, code division in frequency domain, code division in time domain, or code division in time-frequency domain) | For a CSI-RS with one antenna port, there is no limitation on the start subcarrier; For a CSI-RS with two antenna ports, the start subcarrier needs to be an even number; For a CSI-RS with four antenna ports, the start subcarrier needs to be 0, 4, or 8; Time domain resource: The CSI-RS may be sent from any position in a slot of 14 symbols To be determined |

TABLE 2

CSI-RS configuration parameter table 2

| Quantity of antenna ports | CSI-RS signal density (that is, occupied resource elements/resource blocks/ antenna ports) [RE/RB/port] | Quantity of occupied symbols | Occupied resources (occupied resource elements in frequency domain, and occupied symbols in time domain) for each CSI-RS code block | Code division type |
|---|---|---|---|---|
| 1 | >1, 1, ½ | 1 | N.A. | No code division |
| 2 | 1, ½ | 1 | (2, 1) | Frequency-domain code division 2 (that is, two consecutive REs are encoded in frequency) |
| 4 | 1 | 1 | (4, 1) | Frequency-domain code division 2 |
| 8 | 1 | 1 | (2, 1) | Frequency-domain code division 2 |
| 8 | 1 | 2 | (2, 2) | Frequency-domain code division 2, frequency-domain code division 2 + time-domain code division 2 (that is, two consecutive symbols are encoded in time) |
| 12 | 1 | 1 | (2, 1) | Frequency-domain code division 2 |
| 12 | 1 | 2 | (2, 2) | Frequency-domain code division 2 + Time-domain code division 2 |

For example, because a configuration parameter of a resent CSI-RS is basically the same as a configuration parameter of a to-be-resent CSI-RS (that is, an original CSI-RS), an identifier of the original CSI-RS may be used in the downlink indication information to indicate the resent CSI-RS.

For example, a time-frequency resource configuration parameter of the resent CSI-RS may be the same as or different from a time-frequency resource configuration parameter of the original CSI-RS.

It can be learned from Table 1 that a quantity of ports of the original CSI-RS may be 1, 2, 4, 8, 12, 16, 24, or 32, and the original CS-RS may correspond to a plurality of antenna panels. When LBT is independently performed on the plurality of antenna panels, some antenna panels may successfully send a CSI-RS through LBT, and only a CSI-RS corresponding to some other antenna panels need to be resent. Therefore, information used to indicate a quantity of antenna ports corresponding to resent CSI-RSs or code division multiplexing (Code Division Multiplexing, CDM) type information needs to be added to the downlink indication information.

It is assumed that a quantity of antenna ports of the original CSI-RS is 12, and 2-bit information in the DCI may be used to indicate the quantity of antenna ports. For example, '00' indicates that a quantity of antenna ports of the resent CSI-RS is also 12 (that is, CDM type information of the resent CSI-RS is the same as CDM type information of the original CSI-RS). For example, '01' indicates that a quantity of antenna ports of the resent CSI-RS is 8, and corresponding CDM type information, CSI-RS time-frequency resource configuration parameter, and the like may be determined according to the foregoing Table 1 and/or Table 2, so that the resent CSI-RS can be received on a corresponding transmission resource. For example, '10' indicates that a quantity of antenna ports of the resent CSI-RS is 4, and corresponding CDM type information, CSI-RS time-frequency resource configuration parameter, and the like may be determined according to the foregoing Table 1 and/or Table 2, so that the resent CSI-RS can be received on a corresponding transmission resource. For example, '1' indicates that a quantity of antenna ports of the resent CSI-RS is 1, and corresponding CDM type information, CSI-RS time-frequency resource configuration parameter, and the like may be determined according to the foregoing Table 1 and/or Table 2, so that the resent CSI-RS can be received on a corresponding transmission resource.

For example, the downlink indication information may alternatively indicate an identifier of the CSI-RS and a configuration index (config index) in Table 2, so that the terminal determines a corresponding configuration parameter (for example, including but not limited to at least one of the following: a quantity of antenna ports of a resent CSI-RS, CDM type information, and a CS-RS time-frequency resource configuration parameter) based on the configuration index and the CSI-RS configuration parameter table. In this way, the resent CSI-RS can be received on a corresponding transmission resource.

Certainly, the transmission resource of the resent reference signal may alternatively be indicated in another implementable manner. Correspondingly, the terminal may determine the transmission resource of the resent reference signal in the another implementable manner. This is not limited in this embodiment of this application.

Optionally, the network device may send the foregoing configuration parameter information of the CSI-RS to the terminal in advance by using radio resource control (Radio Resource Control, RRC) signaling. Certainly, the network device may alternatively send the information to the terminal by using other signaling. This is not limited in this embodiment of this application.

Step S303: The terminal detects a reference signal from the network device on the first time-frequency resource on the one or more beams.

In this step, for example, the terminal may separately detect a reference signal from the network device on the first time-frequency resource on at least one beam, and determine a received signal strength indicator RSSI of each reference signal, to determine a quantity of reference signals received by the terminal that meet a requirement.

Specifically, for a manner of determining the received signal strength indicator RSSI of each reference signal, refer to a determining manner in a related technology. This is not limited in this embodiment of this application.

Step S304: When a quantity of reference signals whose received signal strength indicators RSSIs are greater than a first preset value in reference signals received on the first time-frequency resource on one of the one or more beams is less than a second preset value, the terminal detects the reference signal and/or the downlink indication information from the network device on the second time-frequency resource on the beam.

In this step, when the quantity of reference signals whose RSSIs are greater than the first preset value in the reference signals received on the first time-frequency resource on one of the one or more beams is less than the second preset value (for example, an integer greater than or equal to 1), the terminal detects the reference signal and/or the downlink indication information from the network device on the second time-frequency resource on the beam. The downlink indication information is used to indicate a sending status of the reference signal on the first time-frequency resource and/or the second time-frequency resource on the beam, so that the terminal learns of the sending status of the reference signal on the first time-frequency resource and/or the second time-frequency resource on the beam, to determine whether to continue to detect a reference signal on the beam or perform a beam recovery process.

For example, when a quantity of reference signals whose RSSIs are greater than the first preset value in the reference signals received on the first time-frequency resource on one of the one or more beams is less than the second preset value, the terminal may detect a reference signal and/or downlink indication information from the network device on a time-frequency resource corresponding to preset duration (for example, the preset duration is equal to duration corresponding to the second time-frequency resource).

For example, when a quantity of reference signals whose RSSIs are greater than the first preset value in the reference signals received on the first time-frequency resource on one of the one or more beams is less than the second preset value, the terminal may enable a beam detection timer (optionally, timing duration of the beam detection timer may be duration corresponding to the second time-frequency resource), and detect a reference signal and/or downlink indication information from the network device before timing of the beam detection timer ends.

For example, the terminal may detect the reference signal and/or the downlink indication information on all or a part of the second time-frequency resource on the beam. The reference signal detected on the second time-frequency resource on the beam may be a part or all of the reference signals detected on the first time-frequency resource on the beam.

In different embodiments, the downlink indication information may include at least one of the following information:

an identifier of at least one reference signal that has been sent on the second time-frequency resource on the beam:

an identifier of at least one reference signal that is not sent on the second time-frequency resource on the beam;

a transmission resource used to resend the at least one reference signal that is not sent on the second time-frequency resource on the beam;

an identifier of at least one reference signal that has been sent on the first time-frequency resource on the beam; and an identifier of at least one reference signal that is not sent on the first time-frequency resource on the beam.

In another embodiment, the downlink indication information may also include an identifier of at least one reference signal that is not sent on the second time-frequency resource on the beam and that corresponds to the latest preset sending time.

Certainly, the downlink indication information may further include other information. This is not limited in this embodiment of this application.

Step S305: When receiving the downlink indication information on the second time-frequency resource on the beam, the terminal continues to detect a reference signal from the network device on the beam.

In this step, when the downlink indication information (used to indicate that the network device does not send a particular reference signal on the second time-frequency resource on the beam) is received on the second time-frequency resource on the beam, the reference signal is not received on the second time-frequency resource on the beam because the network device performs LBT and cannot send the reference signal, but not because the beam itself fails. Therefore, the terminal may continue to detect a reference signal from the network device on the beam, to avoid a waste of communications system resources because the terminal starts the beam recovery process when only a small quantity of reference signals on the beam are not received.

For example, if the downlink indication information includes a transmission resource used to resend at least one reference signal (that is, a to-be-resent reference signal) that is not sent on the second time-frequency resource on the beam, the terminal also separately receives, on the transmission resource of the at least one reference signal indicated in the downlink indication information, a corresponding reference signal (that is, the resent reference signal).

In this embodiment of this application, when determining that a second time-frequency resource on one of the one or more beams is idle through idle channel listening, the network device sends the reference signal and/or the downlink indication information on the second time-frequency resource on the beam. The downlink indication information is used to indicate a sending status of the reference signal on the first time-frequency resource and/or the second time-frequency resource on the beam. Correspondingly, when receiving the downlink indication information on the second time-frequency resource on the beam, the terminal continues to detect a reference signal from the network device on the beam. In this embodiment of this application, the network device sends the downlink indication information to the terminal, so that the terminal learns of the sending status of the reference signal on the first time-frequency resource and/or the second time-frequency resource on the beam, and can accurately determine whether to continue to detect the reference signal on the beam or start the beam recovery process, thereby saving the communications system resources.

In a beam management method provided in another embodiment of this application, based on the foregoing example, a case in which "the downlink indication information is not received on the second time-frequency resource on the beam" is described in this embodiment of this application.

In this embodiment of this application, when the downlink indication information is not received on the second time-frequency resource on the beam, and a quantity of reference signals whose RSSIs are greater than the first preset value in the reference signals received on the second time-frequency resource on the beam is still less than the second preset value, the terminal performs beam recovery, and the beam is considered as an invalid beam.

For a specific beam recovery manner, at least refer to the foregoing beam recovery manner. This is not limited in this embodiment of this application.

In this embodiment of this application, when the downlink indication information is not received on the second time-frequency resource on the beam, and a quantity of reference signals whose RSSIs are greater than the first preset value in the reference signals received on the second time-frequency resource on the beam is greater than or equal to the second preset value, the terminal continues to detect a reference signal from the network device on the beam, and the beam is considered as a valid beam.

In this embodiment of this application, when the downlink indication information is not received on the second time-frequency resource on the beam, the terminal further determines whether a quantity of reference signals whose RSSIs are greater than the first preset value in the reference signals received on the second time-frequency resource on the beam is less than the second preset value, to determine whether to continue to detect a reference signal on the beam or start a beam recovery process. It can be learned that whether the beam is valid can be more accurately determined by using both the downlink indication information and the RSSI of the received reference signal.

In a beam management method provided in another embodiment of this application, the beam management method is described when the downlink indication information includes different information. It should be noted that, in this embodiment of this application, the beam management method provided in this embodiment of this application is described by using an example in which "when a quantity of reference signals whose RSSIs are greater than the first preset value in reference signals received on the first time-frequency resource on one of the one or more beams is less than the second preset value, the terminal may enable a beam detection timer".

For example, the downlink indication information may include an identifier of at least one reference signal that is not sent on a second time-frequency resource on the beam, and a transmission resource used to resend the at least one reference signal that is not sent on the second time-frequency resource on the beam.

Figure 4:
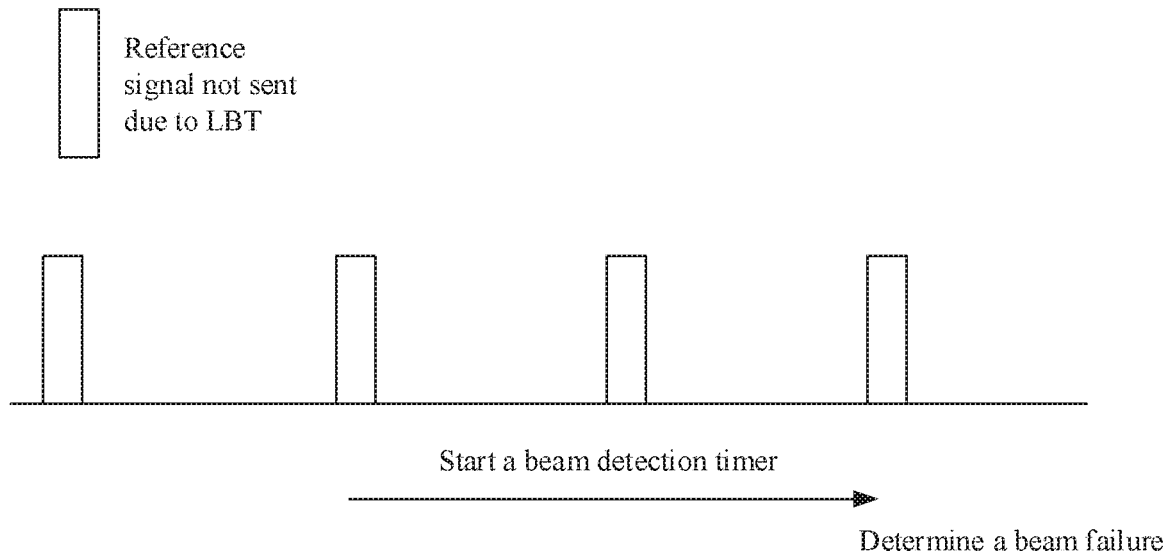
FIG. 4 is a schematic diagram 2 of beam management according to an embodiment of this application.
Figure 5:
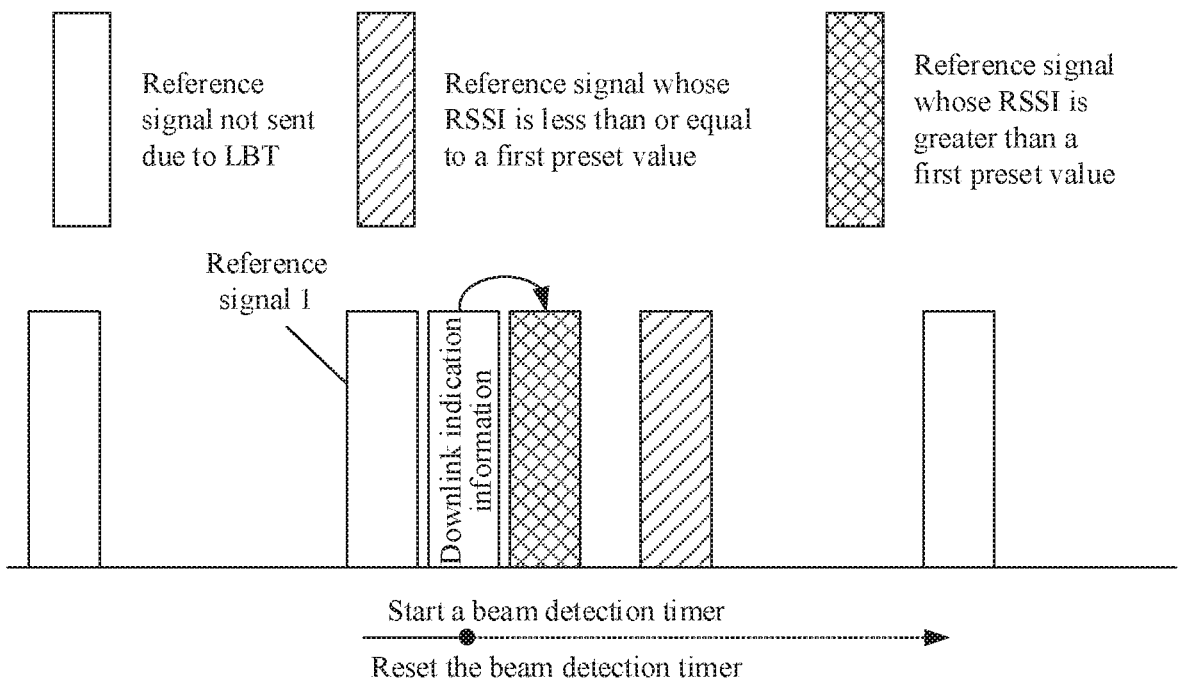
FIG. 5 is a schematic diagram 3 of beam management according to an embodiment of this application.
Figure 6:
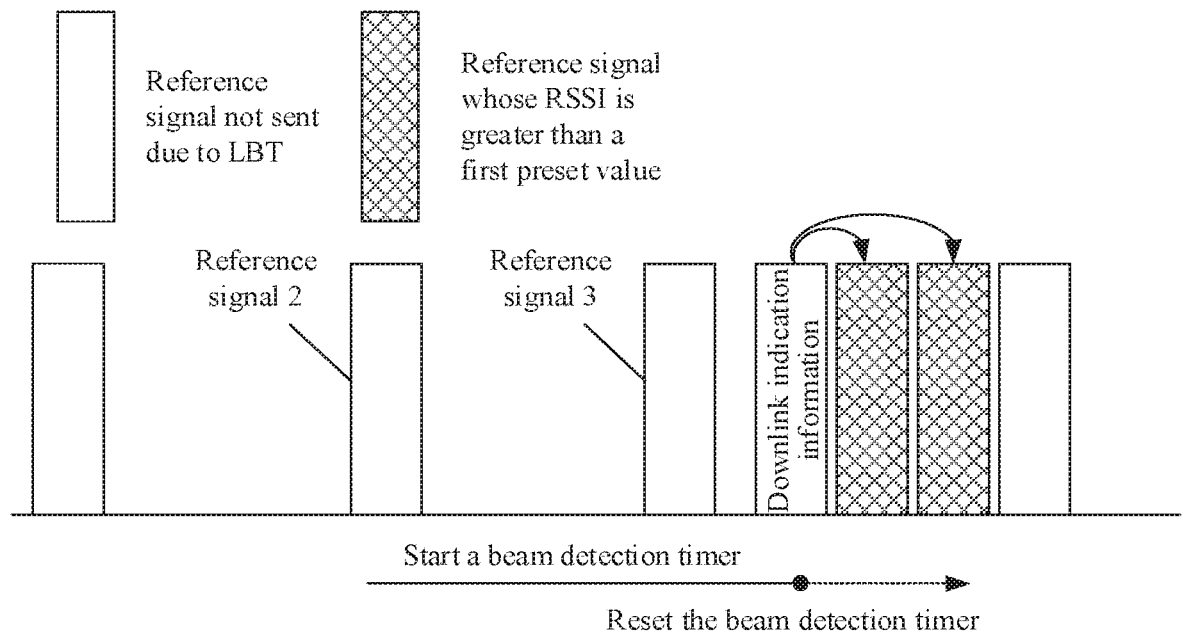
FIG. 6 is a schematic diagram 4 of beam management according to an embodiment of this application.
Figure 7:
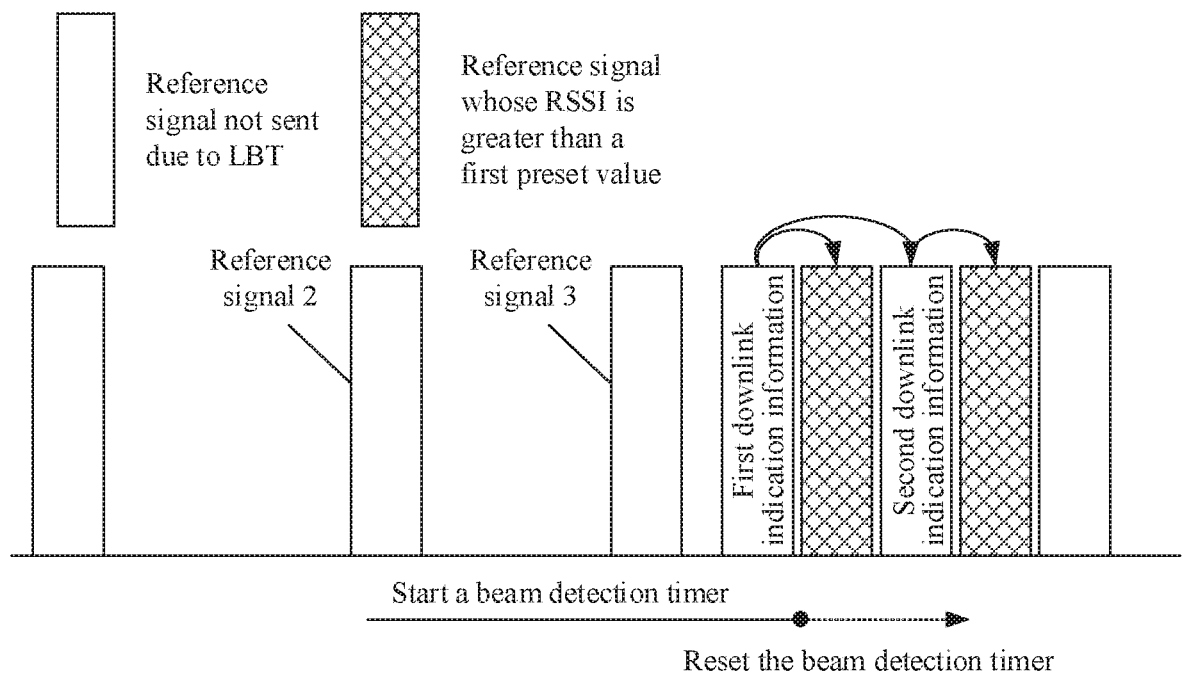
FIG. 7 is a schematic diagram 5 of beam management according to an embodiment of this application.

FIG. 4 is a schematic diagram 2 of beam management according to an embodiment of this application. FIG. 5 is a schematic diagram 3 of beam management according to an embodiment of this application. FIG. 6 is a schematic diagram 4 of beam management according to an embodiment of this application. FIG. 7 is a schematic diagram 5 of beam management according to an embodiment of this application. As shown in FIG. 4, if a quantity of reference signals whose RSSIs are greater than the first preset value in the reference signals received on the first time-frequency resource on one of the one or more beams is less than 2, the terminal may enable the beam detection timer. Further, if a quantity of received reference signals whose RSSIs are greater than the first preset value before timing of the beam detection timer ends is still less than 2, the terminal determines that the beam fails, and a subsequent beam recovery process needs to be performed.

As shown in FIG. 5, if a quantity of reference signals whose RSSIs are greater than the first preset value in the reference signals received on the first time-frequency resource on one of the one or more beams is less than 2, the terminal may enable the beam detection timer. It is assumed that the network device cannot send a reference signal 1 on the second time-frequency resource on the beam due to LBT. Further, the network device sends downlink indication information to the terminal before timing of the beam detection timer ends, where the downlink indication information may include an identifier of the unsent reference signal 1 and a transmission resource used to resend the reference signal 1. Further, when the terminal receives the downlink indication information before the timing of the beam detection timer ends, the beam detection timer is reset, so that even if a quantity of received reference signals whose RSSIs are greater than the first preset value before timing of the beam detection timer ends is still less than 2, the terminal does not determine the beam as an invalid beam, and continues to detect a reference signal from the network device on the beam. The foregoing steps are repeatedly performed.

As shown in FIG. 6 or FIG. 7, if a quantity of reference signals whose RSSIs are greater than the first preset value in the reference signals received on the first time-frequency resource on one of the one or more beams is less than 2, the terminal may enable the beam detection timer. It is assumed that the network device cannot send a reference signal 2 and a reference signal 3 on the second time-frequency resource on the beam due to LBT. Further, the network device sends downlink indication information to the terminal before timing of the beam detection timer ends, where the downlink indication information may include: an identifier of the unsent reference signal 2, an identifier of the unsent reference signal 3, a transmission resource used to resend the reference signal 2, and a transmission resource used to resend the reference signal 3. Further, when the terminal receives the downlink indication information before the timing of the beam detection timer ends, the beam detection timer is reset, so that even if a quantity of received reference signals whose RSSIs are greater than the first preset value before timing of the beam detection timer ends is still less than the second preset value, the terminal does not determine the beam as an invalid beam, and continues to detect a reference signal from the network device on the beam. The foregoing steps are repeatedly performed.

It should be noted that, as shown in FIG. 6, the downlink indication information may be carried in a same PDCCH. Alternatively, as shown in FIG. 7, first downlink indication information (including the identifier of the unsent reference signal 2 and the transmission resource used to resend the reference signal 2) is carried in a PDCCH, and second downlink indication information (including the identifier of the unsent reference signal 3 and the transmission resource used to resend the reference signal 3) is carried in another PDCCH.

Optionally, a duration interval for the network device to resend the reference signal may be equal to a sending period of the reference signal, less than a sending period of the reference signal, or greater than a sending period of the reference signal. A specific resending moment of the reference signal is indicated to the terminal by using the downlink indication information. For example, the duration interval for resending the reference signal may be predefined by a system, or may be specifically configured for the network device.

In this embodiment of this application, when the network device cannot send the reference signal due to LBT, the network device may indicate, in the downlink indication information, the identifier of the reference signal that is not sent on the second time-frequency resource on the beam and the transmission resource used to resend the reference signal, so that the terminal learns of a sending status of the reference signal on the beam, and can accurately determine whether to continue to detect a reference signal on the beam or start a beam recovery process, to avoid a waste of communications system resources because the terminal starts the beam recovery process when only a small quantity of reference signals on the beam are not received, thereby saving the communications system resources.

For example, the downlink indication information may include an identifier of at least one reference signal that is not sent on the second time-frequency resource on the beam and that corresponds to the latest preset sending time.

Figure 8:
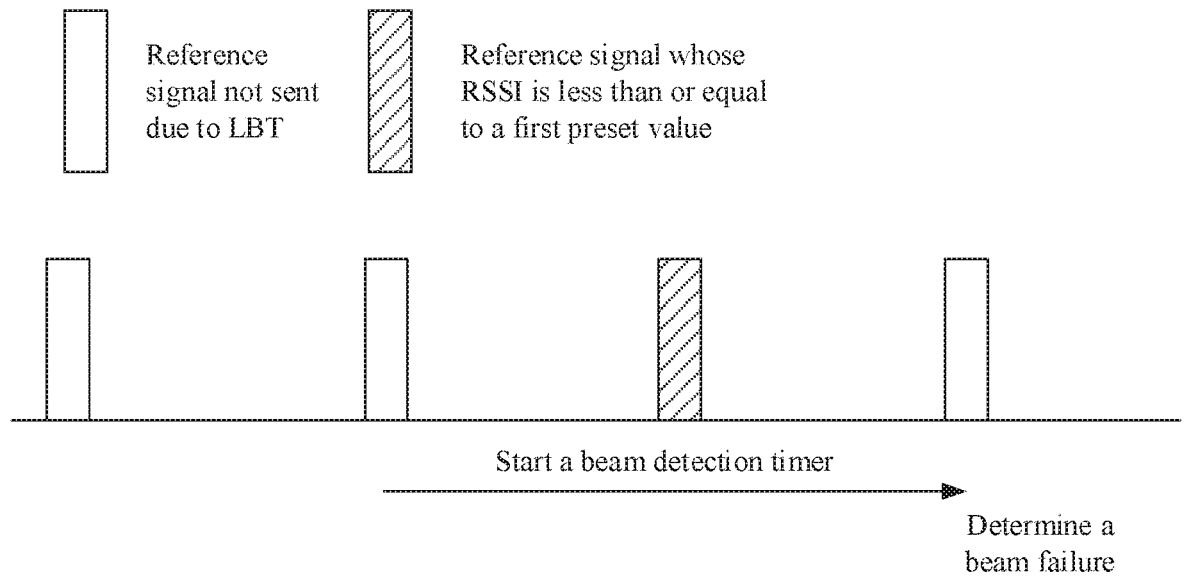
FIG. 8 is a schematic diagram 6 of beam management according to an embodiment of this application.
Figure 9:
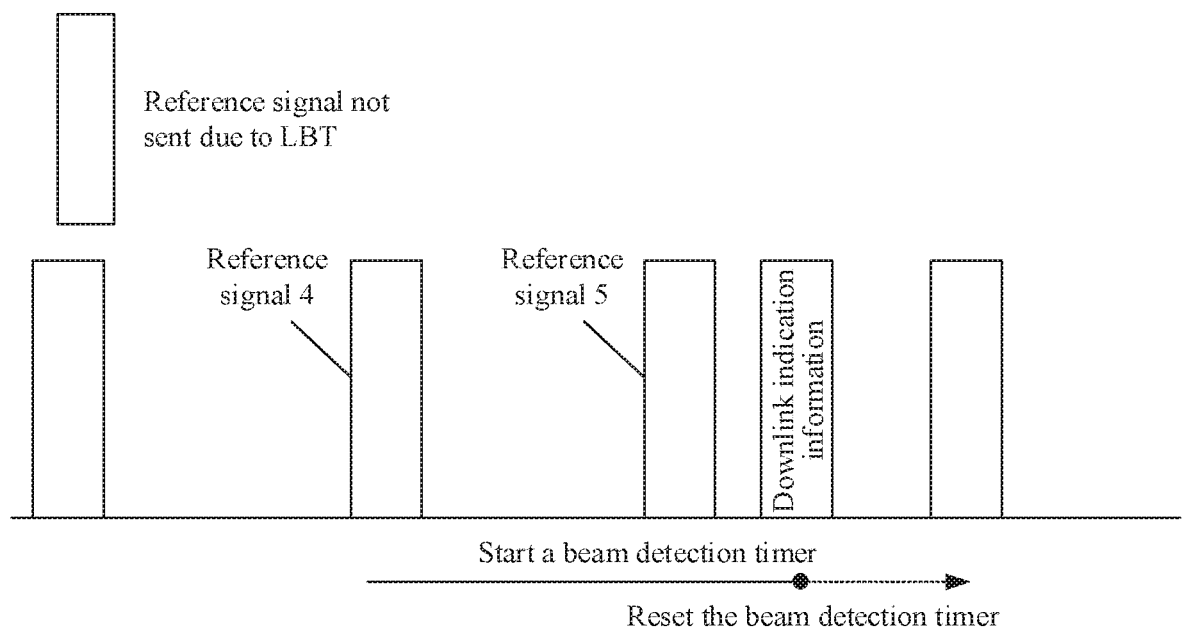
FIG. 9 is a schematic diagram 7 of beam management according to an embodiment of this application.
Figure 10:
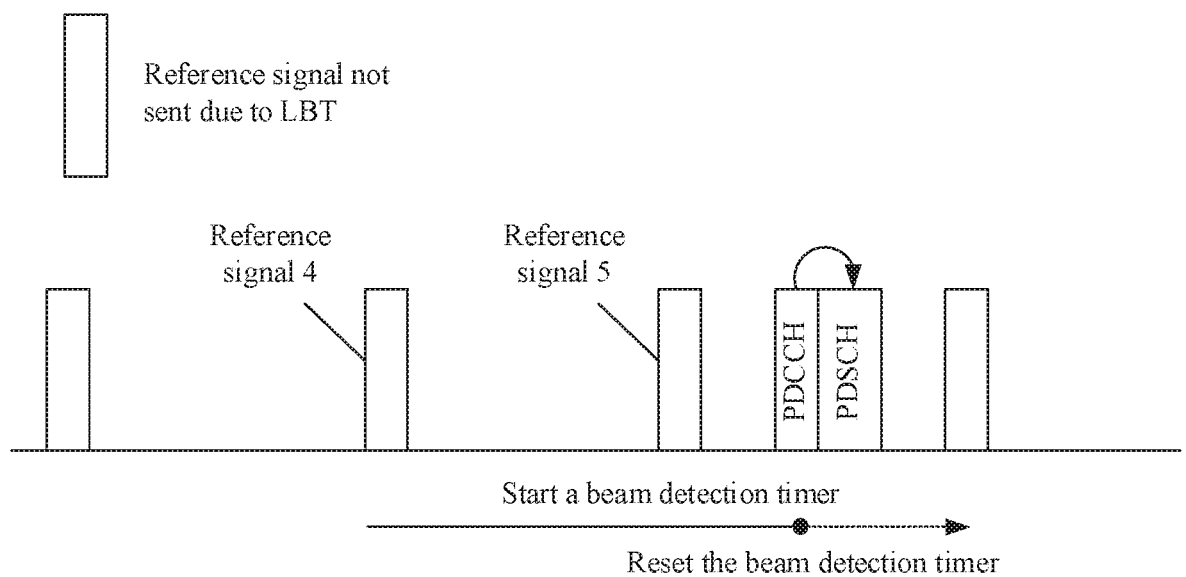
FIG. 10 is a schematic diagram 8 of beam management according to an embodiment of this application.

FIG. 8 is a schematic diagram 6 of beam management according to an embodiment of this application. FIG. 9 is a schematic diagram 7 of beam management according to an embodiment of this application. FIG. 10 is a schematic diagram 8 of beam management according to an embodiment of this application. As shown in FIG. 8, if a quantity of reference signals whose RSSIs are greater than the first preset value in the reference signals received on the first time-frequency resource on one of the one or more beams is less than 2, the terminal may enable a beam detection timer. Further, if a quantity of received reference signals whose RSSIs are greater than the first preset value before timing of the beam detection timer ends is still less than 2, the terminal determines that the beam fails, and a subsequent beam recovery process needs to be performed.

As shown in FIG. 9 or FIG. 10, if a quantity of reference signals whose RSSIs are greater than the first preset value in the reference signals received on the first time-frequency resource on one of the one or more beams is less than 2, the terminal may enable the beam detection timer. It is assumed that the network device cannot send a reference signal 4 and a reference signal 5 on the second time-frequency resource on the beam due to LBT. Further, the network device sends downlink indication information to the terminal before timing of the beam detection timer ends, where the downlink indication information may include an identifier of the unsent reference signal 5. Further, when the terminal receives the downlink indication information before the timing of the beam detection timer ends, the beam detection timer is reset, so that even if a quantity of received reference signals whose RSSIs are greater than the first preset value before timing of the beam detection timer ends is still less than 2, the terminal does not determine the beam as an invalid beam, and continues to detect a reference signal from the network device on the beam. The foregoing steps are repeatedly performed.

For example, the network device may scramble downlink control information (UE-specific DCI) of specific UE (that is, a terminal) by using a radio network temporary identifier (Radio Network Temporary Identifier, RNTI), to carry the downlink indication information. Certainly, the downlink indication information may alternatively be carried in another manner. This is not limited in this embodiment of this application.

As shown in FIG. 10, the downlink indication information may alternatively be carried in a PDSCH. For example, the downlink indication information may be carried by using a Media Access Control (Media Access Control, MAC) layer control element (MAC control element, MAC CE) that is of the PDSCH and that is indicated by a PDCCH. Certainly, the downlink indication information may alternatively be carried in the PDSCH in another manner. This is not limited in this embodiment of this application.

It should be noted that, in the embodiments of this application, when the network device does not send a reference signal due to LBT, and sends only downlink indication information (used to indicate the reference signal that is not sent), after the terminal receives the downlink indication information sent by the network device, RSSIs obtained on a preset historical time-frequency resource (that is, a time-frequency resource used to initially send the reference signal) are deleted, and an average value of the RSSIs is updated again. When the network device does not send a reference signal due to LBT, and not only sends downlink indication information (used to indicate the reference signal that is not sent and a target transmission resource used to resend the reference signal), but also resends the reference signal on the corresponding target transmission resource, after the terminal receives the resent reference signal on the target transmission resource, RSSIs obtained on a preset historical time-frequency resource is replaced with RSSIs obtained on the target transmission resource, and an average value of the RSSIs is updated.

In this embodiment of this application, when the network device cannot send the reference signal due to LBT, the network device may indicate, in the downlink indication information, an identifier of a reference signal that is not sent on the second time-frequency resource on the beam and that corresponds to the latest preset sending time, so that the terminal learns of a sending status of the reference signal on the beam, and can accurately determine whether to continue to detect a reference signal on the beam or start a beam recovery process, to avoid a waste of communications system resources because the terminal starts the beam recovery process when only a small quantity of reference signals on the beam are not received, thereby saving the communications system resources.

For example, the downlink indication information may include at least one of the following information; an identifier of at least one reference signal that has been sent on the second time-frequency resource on the beam, an identifier of at least one reference signal that is not sent on the second time-frequency resource on the beam, and a transmission resource used to resend the at least one reference signal that is not sent on the second time-frequency resource on the beam.

Figure 11:
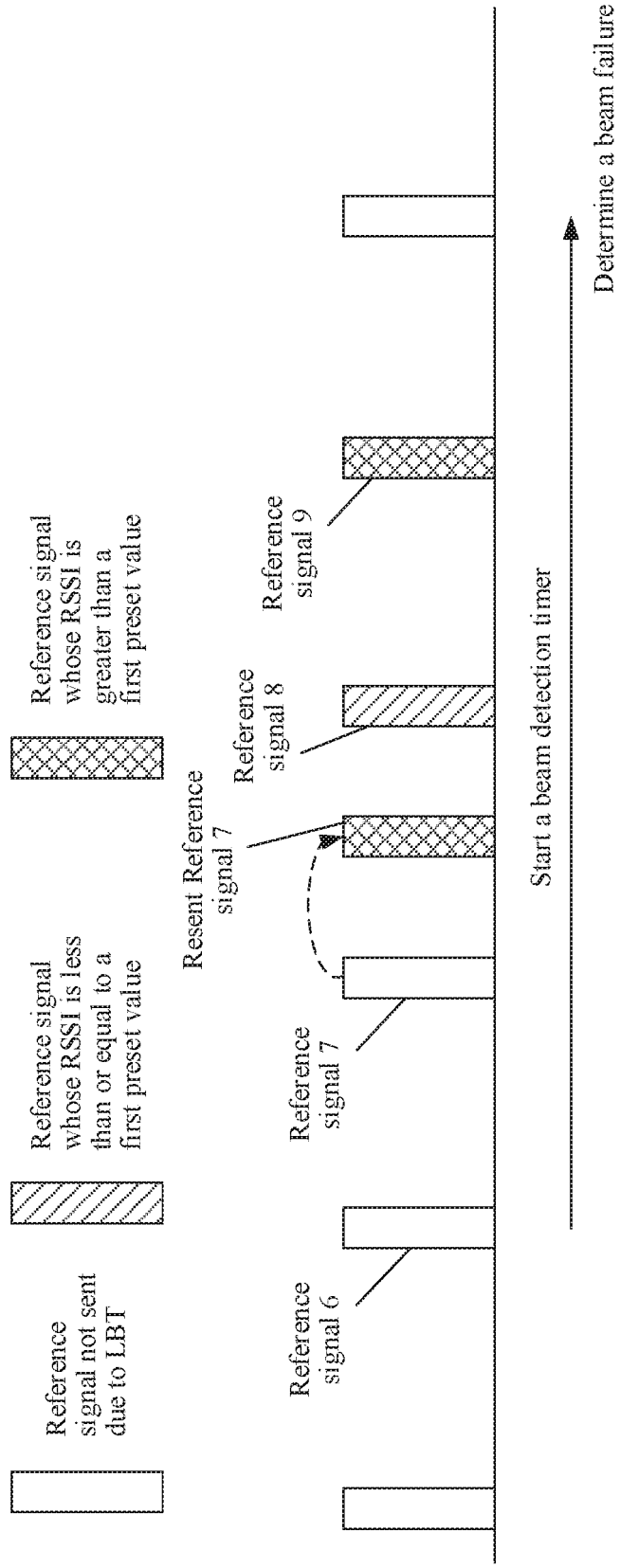
FIG. 11 is a schematic diagram 9 of beam management according to an embodiment of this application.
Figure 12:
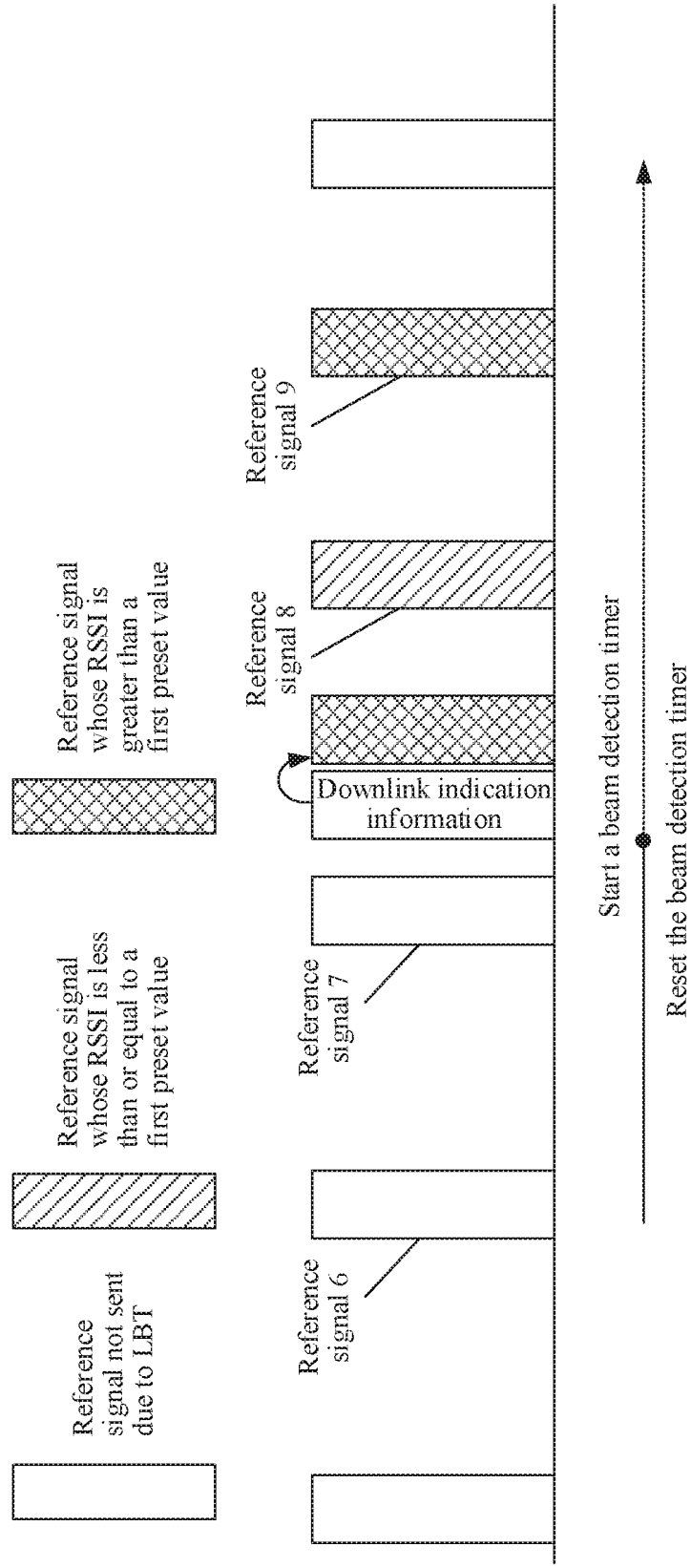
FIG. 12 is a schematic diagram 10 of beam management according to an embodiment of this application.

FIG. 11 is a schematic diagram 9 of beam management according to an embodiment of this application. FIG. 12 is a schematic diagram 10 of beam management according to an embodiment of this application. As shown in FIG. 11, if a quantity of consecutive reference signals whose RSSIs are greater than the first preset value in the reference signals received on the first time-frequency resource on one of the one or more beams is less than 2, the terminal may enable the beam detection timer. Further, if a quantity of received consecutive reference signals whose RSSIs are greater than the first preset value before timing of the beam detection timer ends is less than 2 (for example, a reference signal 6 fails to be sent and is not successfully resent due to LBT, a reference signal 7 fails to be sent but is successfully resent, a reference signal 8 is successfully sent and an RSSI is less than the first preset value, and a reference signal 9 is successfully sent), the terminal still determines that the beam fails, and a subsequent beam recovery process needs to be performed.

As shown in FIG. 12, if a quantity of reference signals whose RSSIs are greater than the first preset value in the reference signals received on the first time-frequency resource on one of the one or more beams is less than 2, the terminal may enable the beam detection timer. It is assumed that the network device cannot send a reference signal 6 and a reference signal 7 on the second time-frequency resource on the beam due to LBT. Further, the network device sends downlink indication information to the terminal before timing of the beam detection timer ends, where the downlink indication information may include: an identifier of the unsent reference signal 6, an identifier of the unsent reference signal 7, and a transmission resource used to resend the reference signal 7. Further, when the terminal receives the downlink indication information before the timing of the beam detection timer ends, the beam detection timer is reset, so that even if a quantity of received consecutive reference signals whose RSSIs are greater than the first preset value before timing of the beam detection timer ends is still less than 2, the terminal does not determine the beam as an invalid beam, and continues to detect a reference signal from the network device on the beam. The foregoing steps are repeatedly performed.

In this embodiment of this application, when the network device cannot send the reference signal due to LBT, the network device indicates, in the downlink indication information, in addition to indicating whether a previous reference signal is sent, sending statuses of previous several reference signals (optionally, a quantity of the several reference signals may be the same as a quantity of reference signals included before the timing of the beam detection timer ends), so that the terminal learns of the sending statuses of the reference signals on the beam, and can accurately determine whether to continue to detect a reference signal on the beam or start a beam recovery process, to avoid a waste of communications system resources because the terminal starts the beam recovery process when only a small quantity of reference signals on the beam are not received, thereby saving the communications system resources.

It should be noted that, when the downlink indication information may include other information, for a corresponding beam management method, refer to the methods shown in FIG. 4 to FIG. 12. Details are not described herein again.

In a beam management method provided in another embodiment of this application, the terminal may configure a plurality of groups of non zero power-channel state information reference signals (Non Zero Power CSI-RS. NZP CSI-RS) and zero power channel state information reference signals (Zero Power CSI-RS, ZP CSI-RS) by using RRC. The NZP CSI-RS corresponds to a CSI-RS of a serving base station, and the ZP CSI-RS corresponds to a CSI-RS of another non-serving base station.

Figure 13:
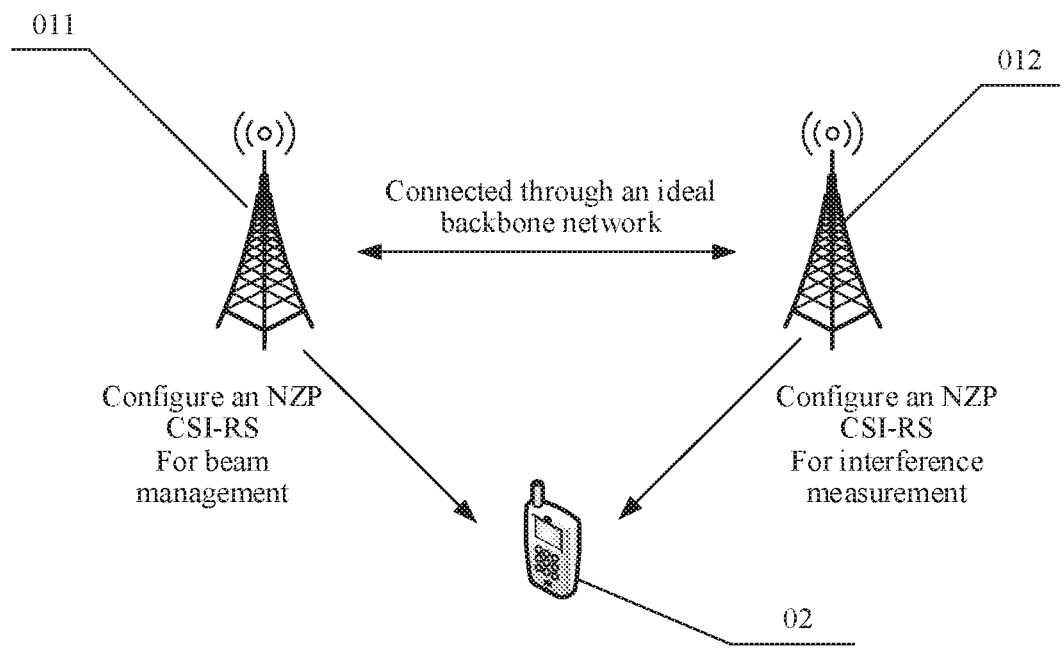
FIG. 13 is a schematic diagram of an application scenario according to an embodiment of this application.

FIG. 13 is a schematic diagram of an application scenario according to this embodiment of this application. As shown in FIG. 13, when network devices (for example, a network device 011 and a network device 012) are connected through an ideal backbone network (ideal backhaul), it is considered that there is no delay in transmission between the network devices. Therefore, an LBT result between the network devices may be notified to a terminal 02 in a timely manner. Further, the terminal may learn, based on the LBT result between the network devices, whether the preconfigured NZP CSI-RS and/or ZP CSI-RS are/is successfully sent, thereby helping the terminal more accurately perform interference measurement and CSI reporting.

Figure 14:
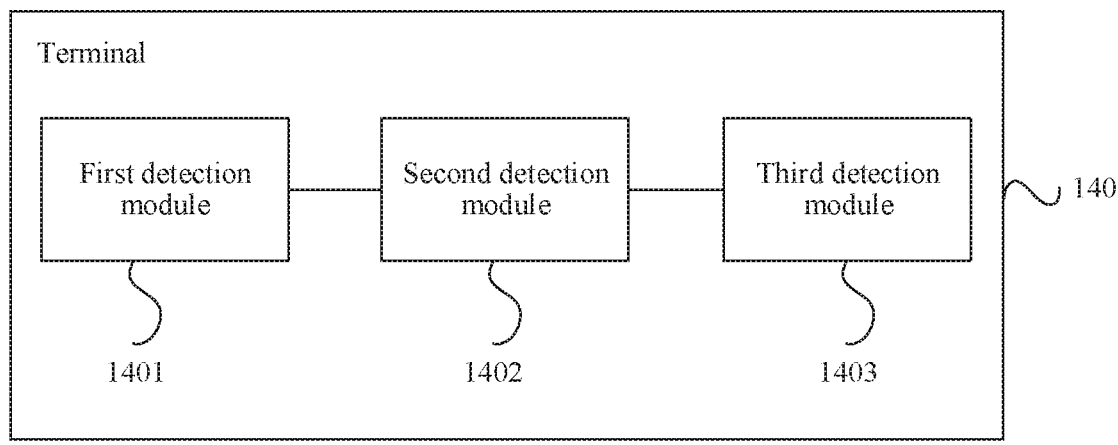
FIG. 14 is a schematic structural diagram of a terminal according to an embodiment of this application.

FIG. 14 is a schematic structural diagram of a terminal according to an embodiment of this application. As shown in FIG. 14, the terminal 140 provided in this embodiment may include a first detection module 1401, a second detection module 1402, and a third detection module 1403.

The first detection module 1401 is configured to detect a reference signal from a network device on a first time-frequency resource on one or more beams.

The second detection module 1402 is configured to: when a quantity of reference signals whose received signal strength indicators RSSIs are greater than a first preset value in reference signals received on the first time-frequency resource on one of the one or more beams is less than a second preset value, detect a reference signal and/or downlink indication information from the network device on a second time-frequency resource on the beam, where the downlink indication information is used to indicate a sending status of the reference signal on the first time-frequency resource and/or the second time-frequency resource on the beam.

The third detection module 1403 is configured to: when the downlink indication information is received on the second time-frequency resource on the beam, continue to detect a reference signal from the network device on the beam.

In a possible implementation, the second detection module 1402 is specifically configured to:

detect the reference signal and/or downlink indication information on a part of the second time-frequency resource on the beam.

The reference signal detected on the second time-frequency resource on the beam is a part of the reference signals detected on the first time-frequency resource on the beam.

In a possible implementation, the downlink indication information includes at least one of the following information:

an identifier of at least one reference signal that has been sent on the second time-frequency resource on the beam;

an identifier of at least one reference signal that is not sent on the second time-frequency resource on the beam;

a transmission resource used to resend the at least one reference signal that is not sent on the second time-frequency resource on the beam;

an identifier of at least one reference signal that has been sent on the first time-frequency resource on the beam; and an identifier of at least one reference signal that is not sent on the first time-frequency resource on the beam.

In a possible implementation, if the downlink indication information includes the transmission resource used to resend the at least one reference signal that is not sent on the second time-frequency resource on the beam, the terminal 140 further includes:

a receiving module, configured to receive the at least one reference signal on the transmission resource of the at least one reference signal based on the downlink indication information.

In a possible implementation, the downlink indication information includes:

an identifier of at least one reference signal that is not sent on the second time-frequency resource on the beam and that corresponds to the latest preset sending time.

In a possible implementation, the downlink indication information is carried in a physical downlink control channel PDCCH or a physical downlink shared channel PDSCH.

In a possible implementation, the terminal 140 further includes:

a recovery module, configured to perform beam recovery when a quantity of reference signals whose RSSIs are greater than the first preset value in reference signals received on the second time-frequency resource on the beam is less than the second preset value, and the downlink indication information is not received on the second time-frequency resource on the beam.

The terminal 140 provided in this embodiment of this application may be configured to perform the technical solution related to the terminal in the foregoing beam management method embodiments of this application. Implementation principles and technical effects thereof are similar to those in the method embodiments. Details are not described herein again.

Figure 15:
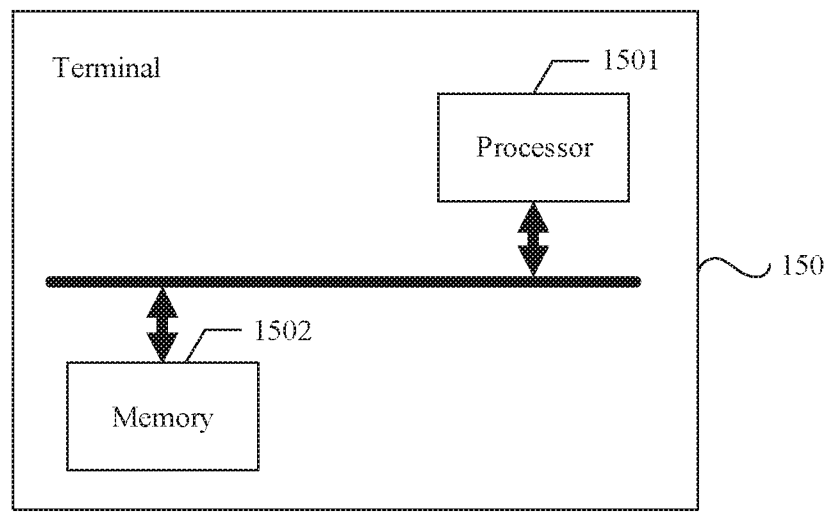
FIG. 15 is a schematic structural diagram of a terminal according to another embodiment of this application.

FIG. 15 is a schematic structural diagram of a terminal according to another embodiment of this application. As shown in FIG. 15, the terminal 150 provided in this embodiment may include a processor 1501 and a memory 1502.

The memory 1502 is configured to store a program instruction.

The processor 1501 is configured to invoke and execute the program instruction stored in the memory 1502. When the processor 1501 executes the program instruction stored in the memory 1502, the terminal 150 is configured to perform the technical solution related to the terminal in the foregoing beam management method embodiments of this application. Implementation principles and technical effects thereof are similar to those in the method embodiments. Details are not described herein again.

It may be understood that FIG. 15 shows only a simplified design of the terminal. In another implementation, the terminal may further include any quantity of transceivers, processors, memories, and/or communications units, and the like. This is not limited in this embodiment of this application.

Figure 16:
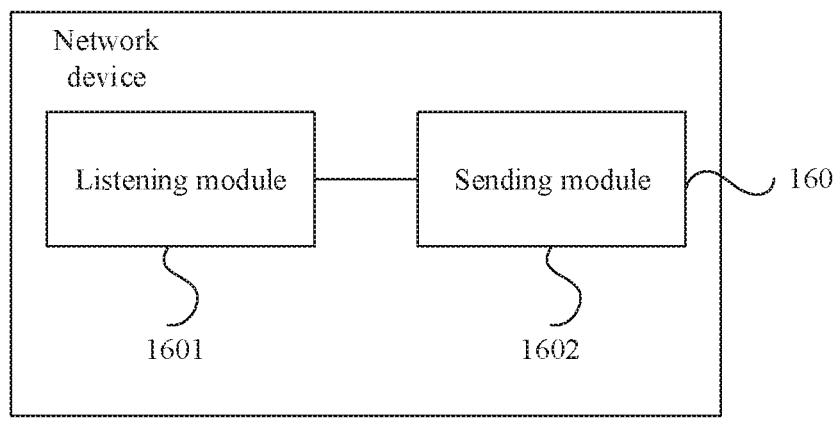
FIG. 16 is a schematic structural diagram of a network device according to an embodiment of this application.

FIG. 16 is a schematic structural diagram of a network device according to an embodiment of this application. As shown in FIG. 16, the network device 160 provided in this embodiment may include a listening module 1601 and a sending module 1602.

The listening module 1601 is configured to perform idle channel listening on a second time-frequency resource on one or more beams.

The sending module 1602 is configured to: if a second time-frequency resource on one of the one or more beams is idle, send a reference signal and/or downlink indication information to a terminal on the second time-frequency resource on the beam. The downlink indication information is used to indicate a sending status of the reference signal on a first time-frequency resource and/or the second time-frequency resource on the beam, and the first time-frequency resource is located before the second time-frequency resource in time domain.

In a possible implementation, the sending module 1602 is specifically configured to:

send the reference signal and/or downlink indication information to the terminal on a part of the second time-frequency resource on the beam.

The reference signal sent to the terminal on the second time-frequency resource on the beam is a part of reference signals sent to the terminal on the first time-frequency resource on the beam.

In a possible implementation, the downlink indication information includes at least one of the following information:

an identifier of at least one reference signal that has been sent on the second time-frequency resource on the beam;

an identifier of at least one reference signal that is not sent on the second time-frequency resource on the beam:

a transmission resource used to resend the at least one reference signal that is not sent on the second time-frequency resource on the beam:

an identifier of at least one reference signal that has been sent on the first time-frequency resource on the beam; and an identifier of at least one reference signal that is not sent on the first time-frequency resource on the beam.

In a possible implementation, the downlink indication information includes an identifier of at least one reference signal that is not sent on the second time-frequency resource on the beam and that corresponds to the latest preset sending time.

In a possible implementation, the downlink indication information is carried in a physical downlink control channel PDCCH or a physical downlink shared channel PDSCH.

The network device 160 provided in this embodiment of this application may be configured to perform the technical solution related to the network device in the foregoing beam management method embodiments of this application.

Implementation principles and technical effects thereof are similar to those in the method embodiments. Details are not described herein again.

Figure 17:
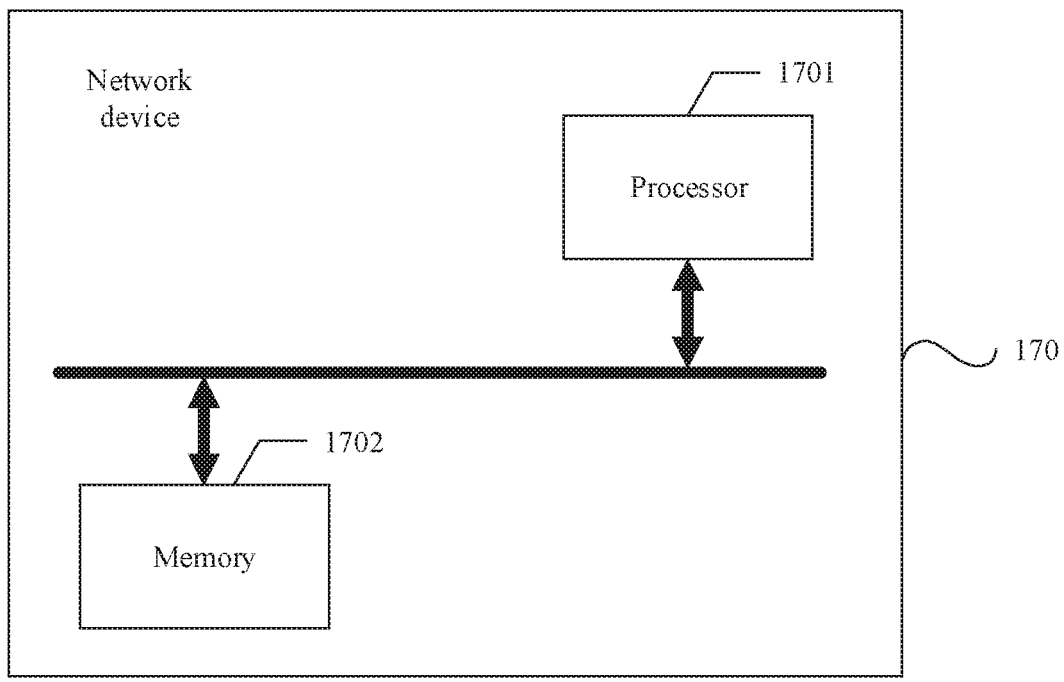
FIG. 17 is a schematic structural diagram of a network device according to another embodiment of this application.

FIG. 17 is a schematic structural diagram of a network device according to another embodiment of this application. As shown in FIG. 17, the network device 170 provided in this embodiment may include a processor 1701 and a memory 1702.

The memory 1702 is configured to store a program instruction.

The processor 1701 is configured to invoke and execute the program instruction stored in the memory 1702. When the processor 1701 executes the program instruction stored in the memory 1702, the network device 170 is configured to perform the technical solution related to the network device in the foregoing beam management method embodiments of this application. Implementation principles and technical effects thereof are similar to those in the method embodiments. Details are not described herein again.

It may be understood that FIG. 17 shows only a simplified design of the network device. In another implementation, the network device may further include any quantity of transceivers, processors, memories, and/or communications units, and the like. This is not limited in this embodiment of this application.

An embodiment of this application further provides a chip system. The chip system includes a processor, and may further include a memory. The chip system is configured to implement the technical solution related to the terminal in the foregoing beam management method embodiments of this application. Implementation principles and technical effects thereof are similar to those in the method embodiments. Details are not described herein again. The chip system may include a chip, or may include a chip and another discrete component.

An embodiment of this application further provides a program. When being executed by a processor, the program is configured to perform the technical solution related to the terminal in the foregoing beam management method embodiments of this application. Implementation principles and technical effects are similar to those in the method embodiments. Details are not described herein again.

An embodiment of this application further provides a computer program product including an instruction. When the computer program product is run on a computer, the computer is enabled to perform the technical solution related to the terminal device in the foregoing beam management method embodiments of this application. Implementation principles and technical effects are similar to those in the method embodiments. Details are not described herein again.

An embodiment of this application further provides a computer-readable storage medium. The computer-readable storage medium stores an instruction. When the instruction is run on a computer, the computer is enabled to perform the technical solution related to the terminal in the foregoing beam management method embodiments of this application. Implementation principles and technical effects are similar to those in the method embodiments. Details are not described herein again.

An embodiment of this application further provides a chip system. The chip system includes a processor, and may further include a memory. The chip system is configured to implement the technical solution related to the network device in the foregoing beam management method embodiments of this application. Implementation principles and technical effects thereof are similar to those in the method embodiments. Details are not described herein again. The chip system may include a chip, or may include a chip and another discrete component.

An embodiment of this application further provides a program. When being executed by a processor, the program is configured to perform the technical solution related to the network device in the foregoing beam management method embodiments of this application. Implementation principles and technical effects are similar to those in the method embodiments. Details are not described herein again.

An embodiment of this application further provides a computer program product including an instruction. When the computer program product is run on a computer, the computer is enabled to perform the technical solution related to the network device in the foregoing beam management method embodiments of this application. Implementation principles and technical effects are similar to those in the method embodiments. Details are not described herein again.

An embodiment of this application further provides a computer-readable storage medium. The computer-readable storage medium stores an instruction. When the instruction is run on a computer, the computer is enabled to perform the technical solution related to the network device in the foregoing beam management method embodiments of this application. Implementation principles and technical effects are similar to those in the method embodiments. Details are not described herein again.

In the embodiments of this application, the processor may be a general-purpose processor, a digital signal processor, an application-specific integrated circuit, a field programmable gate array or another programmable logic component, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of a hardware module and a software module in the processor.

In this embodiment of this application, the memory may be a nonvolatile memory, for example, a hard disk drive (hard disk drive, HDD) or solid-state drive (solid-state drive, SSD); or may be a volatile memory (volatile memory), for example, a random access memory (random-access memory, RAM). The memory is any other medium that can carry or store expected program code in a form of an instruction or a data structure and that can be accessed by a computer, but is not limited thereto.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented electrically, mechanically, or in another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A beam management method, comprising:
    detecting a reference signal from a network device on a first time-frequency resource on one or more beams;
    detecting at least the reference signal or downlink indication information from the network device on a second time-frequency resource on a beam of the one or more beams in response to a quantity of reference signals, whose received signal strength indicators (RSSIs) are greater than a first preset value in reference signals received on the first time-frequency resource on the beam of the one or more beams, being less than a second preset value, wherein the downlink indication information indicates a sending status of the reference signal on the first time-frequency resource or the second time-frequency resource on the beam of the one or more beams; and
    continuing to detect the reference signal from the network device on the beam of the one or more beams in response to the downlink indication information being received on the second time-frequency resource on the beam of the one or more beams.

2. The method according to claim 1, wherein the detecting at least the reference signal or the downlink indication information from the network device on the second time-frequency resource on the beam of the one or more beams comprises:
    detecting the reference signal or the downlink indication information on a part of the second time-frequency resource on the beam of the one or more beams, wherein
    the reference signal detected on the second time-frequency resource on the beam of the one or more beams is a part of the reference signals detected on the first time-frequency resource on the beam of the one or more beams.

3. The method according to claim 1, wherein the downlink indication information comprises at least one of:
    an identifier of at least one reference signal that has been sent on the second time-frequency resource on the beam of the one or more beams;
    an identifier of at least one reference signal that failed to be sent on the second time-frequency resource on the beam of the one or more beams;
    a transmission resource useable to resend the at least one reference signal that failed to be sent on the second time-frequency resource on the beam of the one or more beams;
    an identifier of at least one reference signal that has been sent on the first time-frequency resource on the beam of the one or more beams; or
    an identifier of at least one reference signal that failed to be sent on the first time-frequency resource on the beam of the one or more beams.

4. The method according to claim 3, wherein in response to the downlink indication information comprises the transmission resource useable to resend the at least one reference signal that failed to be sent on the second time-frequency resource on the beam of the one or more beams, the method further comprises:
    receiving the at least one reference signal on the transmission resource of the at least one reference signal based on the downlink indication information.

5. The method according to claim 1, wherein the downlink indication information comprises:
    an identifier of at least one reference signal that failed to be sent on the second time-frequency resource on the beam of the one or more beams and that corresponds to a latest preset sending time.

6. The method according to claim 1, wherein the downlink indication information is carried in a physical downlink control channel (PDCCH) or a physical downlink shared channel (PDSCH).

7. The method according to claim 1, further comprising:
    performing beam recovery in response to the quantity of reference signals, whose RSSIs are greater than the first preset value in reference signals received on the first time-frequency resource on the beam of the one or more beams, being less than the second preset value, and the downlink indication information fails to be received on the second time-frequency resource on the beam of the one or more beams.

8. A beam management method, comprising:
performing, by a network device, idle channel listening on a second time-frequency resource on one or more beams; and
sending, by the network device, a reference signal and downlink indication information to a terminal on the second time-frequency resource on a beam of the one or more beams in response to the second time-frequency resource on the beam of the one or more beams being idle, wherein the downlink indication information indicates a sending status of the reference signal on a first time-frequency resource or the second time-frequency resource on the beam of the one or more beams, and the first time-frequency resource is before the second time-frequency resource in a time domain.

9. The method according to claim 8, wherein the sending at least the reference signal and the downlink indication information to the terminal on the second time-frequency resource on the beam of the one or more beams comprises:
sending at least the reference signal and the downlink indication information to the terminal on a part of the second time-frequency resource on the beam of the one or more beams, wherein
the reference signal sent to the terminal on the second time-frequency resource on the beam of the one or more beams is a part of reference signals sent to the terminal on the first time-frequency resource on the beam of the one or more beams.

10. The method according to claim 8, wherein the downlink indication information comprises at least one of:
an identifier of at least one reference signal that has been sent on the second time-frequency resource on the beam of the one or more beams;
an identifier of at least one reference signal that failed to be sent on the second time-frequency resource on the beam of the one or more beams;
a transmission resource useable to resend the at least one reference signal that failed to be sent on the second time-frequency resource on the beam of the one or more beams;
an identifier of at least one reference signal that has been sent on the first time-frequency resource on the beam of the one or more beams; or
an identifier of at least one reference signal that failed to be sent on the first time-frequency resource on the beam of the one or more beams.

11. The method according to claim 8, wherein the downlink indication information comprises:
an identifier of at least one reference signal that failed to be sent on the second time-frequency resource on the beam of the one or more beams and that corresponds to a latest preset sending time.

12. The method according to any one of claim 8, wherein the downlink indication information is carried in a physical downlink control channel (PDCCH) or a physical downlink shared channel (PDSCH).

13. A terminal, comprising a processor and a memory, wherein
the memory has a storage medium configured to store non-transitory instructions; and a processor connected to the memory, the processor configured to execute the non-transitory instructions, causing the terminal to:
detect a reference signal from a network device on a first time-frequency resource on one or more beams;
detect at least the reference signal or downlink indication information from the network device on a second time-frequency resource on a beam of the one or more beams in response to a quantity of reference signals, whose received signal strength indicators (RSSIs) are greater than a first preset value in reference signals received on the first time-frequency resource on the beam of the one or more beams, being less than a second preset value, wherein the downlink indication information indicates a sending status of the reference signal on the first time-frequency resource or the second time-frequency resource on the beam of the one or more beams; and
continuing to detect the reference signal from the network device on the beam of the one or more beams in response to the downlink indication information being received on the second time-frequency resource on the beam of the one or more beams.

14. The terminal according to claim 13, wherein the detecting at least the reference signal or the downlink indication information from the network device on the second time-frequency resource on the beam of the one or more beams comprises:
detecting the reference signal or the downlink indication information on a part of the second time-frequency resource on the beam of the one or more beams, wherein
the reference signal detected on the second time-frequency resource on the beam of the one or more beams is a part of the reference signals detected on the first time-frequency resource on the beam of the one or more beams.

15. The terminal according to claim 13, wherein the downlink indication information comprises at least one of:
an identifier of at least one reference signal that has been sent on the second time-frequency resource on the beam of the one or more beams;
an identifier of at least one reference signal that failed to be sent on the second time-frequency resource on the beam of the one or more beams;
a transmission resource useable to resend the at least one reference signal that failed to be sent on the second time-frequency resource on the beam of the one or more beams;
an identifier of at least one reference signal that has been sent on the first time-frequency resource on the beam of the one or more beams; or
an identifier of at least one reference signal that is not sent on the first time-frequency resource on the beam.

16. The terminal according to claim 15, wherein in response to the downlink indication information comprises the transmission resource useable to resend the at least one reference signal that failed to be sent on the second time-frequency resource on the beam of the one or more beams, the method further comprises:
receiving the at least one reference signal on the transmission resource of the at least one reference signal based on the downlink indication information.

17. The terminal according to claim 13, wherein the downlink indication information comprises:
an identifier of at least one reference signal that failed to be sent on the second time-frequency resource on the beam of the one or more beams and that corresponds to a latest preset sending time.

18. The terminal according to claim 13, wherein the downlink indication information is carried in a physical downlink control channel (PDCCH) or a physical downlink shared channel (PDSCH).

19. The terminal according to claim 13, wherein the processor is further configured to execute the non-transitory instructions, causing the terminal to:
   perform beam recovery in response to the quantity of reference signals, whose RSSIs are greater than the first preset value in reference signals received on the first time-frequency resource on the beam of the one or more beams, being less than the second preset value, and the downlink indication information fails to be received on the second time-frequency resource on the beam of the one or more beams.

* * * * *